US011881970B2

(12) United States Patent
Takahashi et al.

(10) Patent No.: US 11,881,970 B2
(45) Date of Patent: Jan. 23, 2024

(54) RADIO WAVE FEATURE VALUE COMPUTATION APPARATUS, RADIO WAVE EMISSION SOURCE IDENTIFICATION APPARATUS, AND METHOD THEREFOR

(71) Applicant: NEC Corporation, Tokyo (JP)

(72) Inventors: Kiyohiko Takahashi, Tokyo (JP); Toshiki Takeuchi, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/988,951

(22) Filed: Nov. 17, 2022

(65) Prior Publication Data

US 2023/0171131 A1 Jun. 1, 2023

(30) Foreign Application Priority Data

Nov. 26, 2021 (JP) ................................. 2021-191982

(51) Int. Cl.
*H04W 4/80* (2018.01)
*H04L 25/03* (2006.01)
*H04L 27/26* (2006.01)

(52) U.S. Cl.
CPC ...... *H04L 25/03019* (2013.01); *H04L 27/265* (2013.01)

(58) Field of Classification Search
CPC ............. H01L 29/7869; H01L 27/1225; H01L 29/78606; H01L 29/24; H01L 27/124;
(Continued)

(56) References Cited

U.S. PATENT DOCUMENTS

| 7,372,825 | B1 * | 5/2008 | Schmidl | ............... H04B 7/2656 370/328 |
| 2018/0176050 | A1 * | 6/2018 | Kikuzuki | ............ H04L 27/0012 |

(Continued)

OTHER PUBLICATIONS

Taichi Ohtsuji, Tatsuya Soma, Toshiki Takeuchi, Masaki Kitsunezuka, and Kazuaki Kunihiro, "An evaluation of propagation loss on wireless physical layer identification", IEICE technical report, SR2018-25, Jul. 2018.

(Continued)

*Primary Examiner* — Eva Y Puente
(74) *Attorney, Agent, or Firm* — Sughrue Mion, PLLC

(57) ABSTRACT

A signal detection unit detects, from a baseband signal of a received radio wave, two types of fixed signal sections that have different communication information and are present in sufficiently shorter time than a time period in which influence of fading fluctuates, and designate the detected two types of fixed signal sections as an information-1 section and an information-2 section. An information-1 section signal processing unit clips the information-1 section from the baseband signal, and performs Fourier transform on the clipped information-1 section. An information-2 section signal processing unit clips the information-2 section from the baseband signal, and performs Fourier transform on the clipped information-2 section. A feature value computation unit computes a feature value, based on an output of the information-1 section signal processing unit and an output of the information-2 section signal processing unit.

12 Claims, 16 Drawing Sheets

(58) Field of Classification Search
CPC ....... H01L 29/66969; H01L 29/66742; H04W 4/80; H04W 4/02; H04W 4/029; H04W 4/21; H04W 4/40; H04W 8/005; H04W 8/20; H04W 8/24; H04W 16/18; H04B 17/27; H04B 17/318; H04B 17/23; H04B 17/345; H04B 7/01; H04B 17/21; H04B 17/29; H04B 1/707; H04B 1/7105
USPC ........................................................ 375/260
See application file for complete search history.

(56) References Cited

U.S. PATENT DOCUMENTS

2019/0086311 A1\* 3/2019 Nordstrom ................ F15C 3/00
2022/0417766 A1\* 12/2022 Oki .......................... H01Q 3/24

OTHER PUBLICATIONS

Guyue Li, Jiabao Yu, Yuexiu Xing, and Aiqun Hu, "Location-Invariant Physical Layer Identification Approach for WiFi Devices", IEEE Access, Special Section on Artificial Intelligence for Physical-Layer Wireless Communications, vol. 7, 2019, pp. 106974-106986, Aug. 5, 2019.

\* cited by examiner

RADIO WAVE FEATURE VALUE COMPUTATION APPARATUS, RADIO WAVE EMISSION SOURCE IDENTIFICATION APPARATUS, AND METHOD THEREFOR

INCORPORATION BY REFERENCE

This application is based upon and claims the benefit of priority from Japanese patent application No. 2021-191982, filed on Nov. 26, 2021, the disclosure of which is incorporated herein in its entirety by reference.

TECHNICAL FIELD

The present disclosure relates to a radio wave feature value computation apparatus, a radio wave emission source identification apparatus, a method therefor, and a program.

BACKGROUND ART

There is a technique of specifying an individual of a wireless communication terminal by analyzing, based on a radio wave being output by the wireless communication terminal, a waveform distortion occurring due to nonlinearity of an analog circuit of a communication terminal. It is known that individual terminals have, depending on production tolerance, different characteristics of a waveform distortion occurring in an analog circuit of the wireless communication terminal. A radio wave emission source can be specified by analyzing a difference in a waveform distortion of each terminal. Examples of a radio wave emission source identification method are described in Non Patent Literature 1 (Taichi Ohtsuji, Tatsuya Soma, Toshiki Takeuchi, Masaki Kitsunezuka, and Kazuaki Kunihiro, "An evaluation of propagation loss on wireless physical layer identification", IEICE technical report, SR2018-25, 2018.) and Non Patent Literature 2 (Guyue Li, Jiabao Yu, Yuexiu Xing, and Aiqun Hu, "Location-Invariant Physical Layer Identification Approach for WiFi Devices", IEEE Access, Special Section on Artificial Intelligence for Physical-Layer Wireless Communications, pp. 106974-106986, 2019.).

In a radio wave emission source identification method described in Non Patent Literature 1, power spectral density that is generated based on a waveform of a known signal such as a preamble signal of a received radio wave is extracted as a feature value. In Non Patent Literature 1, an emission source of a received radio wave is specified by an identification system that is constructed by using a machine learning model which have learned the extracted feature value. In this way, in the radio wave emission source identification method described in Non Patent Literature 1, an emission source of a received radio wave is specified by distinguishing a waveform distortion unique to a terminal, based on the power spectral density.

Meanwhile, in a radio wave emission source identification method described in Non Patent Literature 2, a transient response of a communication terminal is extracted as a feature value from a preamble signal of a received radio wave. In Non Patent Literature 2, an emission source of a received radio wave is specified by an identification system that is constructed by using a machine learning model which have learned the extracted values. The transient response is a type of waveform distortion which is attributable to nonlinearity of an analog circuit of a wireless communication terminal, and, in the radio wave emission source identification method described in Non Patent Literature 2, an emission source of a received radio wave is specified by distinguishing the transient response unique to a radio wave emission source.

More specifically, in Non Patent Literature 2, the transient response is calculated with use of a structure of a Wi-Fi preamble signal. FIG. 14 illustrates a structure of a Wi-Fi preamble signal. The Wi-Fi preamble signal includes a short training sequence (STS) and a long training sequence (LTS). The STS has a signal structure in which an identical signal is repeated ten times on a cycle of 0.8 µs. Meanwhile, the LTS has a signal structure in which an identical signal is repeated two times on a cycle of 3.2 µs.

In Non Patent Literature 2, signals repeated two times in the LTS are clipped. The signals repeated two times ideally have exactly the same waveform. However, in fact, the signals repeated two times have a difference caused by influence of the transient response. In Non Patent Literature 2, the difference is extracted as a feature value. Specifically, the clipped signals are Fourier-transformed, and are transformed into a feature value by performing division on the both signals for each frequency bin. The feature value has a value different for each radio wave emission source. Thus, a radio wave emission source can be specified by using the feature value.

SUMMARY

In Non Patent Literature 1, the power spectral density is used as a feature value. However, the power spectral density includes not only a waveform distortion occurring in an analog circuit of a communication terminal, but also a waveform distortion occurring due to influence of multipath fading. The multipath fading is a phenomenon in which radio waves emitted from a radio wave emission source propagate through a plurality of paths while being reflected by structures, and the radio waves having passed through the plurality of paths with different delay times are superimposed and thereby cause a distortion of a waveform of a received radio wave. A propagation path of a radio wave changes depending on a surrounding environment of a radio wave emission source and a radio wave receiver, and thus, a waveform distortion attributable to the multipath fading also changes depending on a surrounding environment of the radio wave emission source and the radio wave receiver. Accordingly, the power spectral density changes depending on a surrounding environment of the radio wave emission source and the radio wave receiver.

In Non Patent Literature 1, a waveform distortion occurring due to influence of the multipath fading cannot be distinguished from a waveform distortion occurring in an analog circuit of a radio wave emission source, resulting in a problem that the radio wave emission source cannot be specified when a surrounding environment changes. With a configuration in Non Patent Literature 1, a radio wave emission source can be specified only in the same surrounding environment as when learning data for a machine learning model are acquired. In order to specify a radio wave emission source even when a surrounding environment changes, for example, it is necessary to reacquire learning data for a machine learning model every time an installation place of the radio wave emission source changes. However, such operation is possible only in a limited situation. Thus, in Non Patent Literature 1, a radio wave that is measured under a condition with no change in a surrounding environment is used for consideration.

In contrast to the above, the radio wave emission source identification method described in Non Patent Literature 2 uses a feature value that is devised in such a way as not to be influenced by a waveform distortion attributable to the multipath fading. FIG. 15 schematically illustrates a distortion and a noise component by which a signal transmitted by a radio wave emission source is influenced until received by a receiver. When an ideal waveform of the signal transmitted by the radio wave emission source is denoted as S, a waveform of a radio wave being output from the radio wave emission source is represented by G(S) by using an expression G that indicates nonlinearity of the radio wave emission source. The nonlinearity G of the radio wave emission source is a distortion occurring mainly in an analog front-end circuit, and varies for each individual of the radio wave emission source. Due to influence of the distortion, the radio wave emitted from the radio wave emission source becomes a distorted waveform from the ideal waveform S. The waveform is further distorted when a waveform distortion H attributable to the multipath fading is applied to the radio wave. Finally, a signal to which a reception noise N is applied is a recorded signal R that is recorded in the radio wave receiver.

The recorded signal R is represented by an equation in frequency domain as follows.

$$R_i = H_i G_i(S) + N_i \qquad (1)$$

In the above equation 1, i represents the number of a frequency bin. The feature value calculated in Non Patent Literature 2 is computed by dividing, for each frequency, a spectrum of signal sections (L1 and L2) that are repeated two times in the LTS. The feature value calculated in Non Patent Literature 2 can be represented by a following expression 2.

$$\frac{H_{L1,i} G_{L1,i}(S_{L1}) + N_{L1,i}}{H_{L2,i} G_{L2,i}(S_{L2}) + N_{L2,i}} \qquad (2)$$

In the above expression 2, $H_{L1,i}$ and $H_{L2,i}$ are waveform distortions attributable to the multipath fading in the signal sections L1 and L2, respectively. $G_{L1,i}$ and $G_{L2,i}$ are expressions representing nonlinearity of the radio wave emission source in the signal sections L1 and L2, respectively. $S_{L1}$ and $S_{L2}$ are ideal signals in the signal sections L1 and L2, respectively. $N_{L1,i}$ and $N_{L2,i}$ are reception noises in the signal sections L1 and L2, respectively. Since L1 and L2 are repeated in extremely shorter time than fluctuation time of the multipath fading, it can be considered that the following equation 3 can hold.

$$H_{L1,i} = H_{L2,i} \qquad (3)$$

When the reception noise is sufficiently small, the feature value in Non Patent Literature 2 can be approximated as the following expression 4.

$$\frac{G_{L1,i}(S_{L1})}{G_{L2,i}(S_{L2})} \qquad (4)$$

Referring to the above expression 4, the feature value in Non Patent Literature 2 has no term of the waveform distortion H attributable to the multipath fading. Thus, the radio wave emission source identification method described in Non Patent Literature 2 is not influenced by the waveform distortion attributable to the multipath fading. Since the feature value in Non Patent Literature 2 is a value that does not depend on a surrounding environment of the radio wave emission source and the radio wave receiver, it is unnecessary to reacquire learning data for a machine learning model every time an installation place of the radio wave emission source changes.

Meanwhile, Non Patent Literature 2 has a problem that the computed feature value may not be a significant feature value in some cases depending on performance of the radio wave emission source to be specified. In the above expression 4, $S_{L1}$ and $S_{L2}$ are in a relationship of the following equation 5.

$$S_{L1} = S_{L2} \qquad (5)$$

Thus, accordingly, when influence of the reception noise N is ignored, a difference between a denominator and a numerator in the above expression 2 is the expressions $G_{L1,i}$ and $G_{L2,i}$ representing nonlinearity of the radio wave emission source. Therefore, the following equation 6 is a condition where the feature value in Non Patent Literature 2 can work.

$$G_{L1,i}(x) \neq G_{L2,i}(x) \qquad (6)$$

A physical phenomenon generating a difference between $G_{L1,i}$ and $G_{L2,i}$ is a transient response of an analog circuit. The transient response generates a large distortion immediately after signal rise. General communication equipment is designed in such a way that the transient response converges within very short time less than 1 µs. In contrast to this, the LTS used for feature value computation in Non Patent Literature 2 is present at a place where time equal to or more than 8 µs has elapsed after signal rise. Therefore, it is difficult to calculate the transient response of a significant size by using the method described in Non Patent Literature 2.

For ease of understanding the influence of the transient response, suppose that computation equivalent to the above expression 2 is performed by using a beginning of the STS being a rise section of a preamble signal. In this case, replacing the sections L1 and the section L2 with a signal of S1 in FIG. 14 and a signal of S2 in FIG. 14, or the like is conceivable. In such a case, there arises a problem that the influence of the multipath fading cannot be removed this time. Since the multipath fading is a phenomenon that is generated by superimposition of radio waves having different delay times, the number of delayed radio waves to be superimposed in a signal rise section is different from another section. That is, the waveform distortion H attributable to the multipath fading is different between a signal rise section and another section. Thus, a relationship equivalent to the equation 3 does not hold between an S1 section and an S2 section. Therefore, unlike the expression 4, the feature value that is not influenced by the multipath fading cannot be calculated. In order to remove influence of the phenomenon (inter-symbol interference), a Wi-Fi signal includes a section called a cyclic prefix (CP) provided in 0.8 µs immediately after switching of a communication signal, and the section is not used for propagation of the communication signal. Similarly, when the beginning 0.8 µs of the STS is not used for computation of the feature value, the influence of the multipath fading can be removed from the feature value. However, similarly to a case of computing the feature value from the LTS, the feature value in which the nonlinearity attributable to the transient response is reflected cannot be acquired.

Further, Non Patent Literature 2 also has a problem that the reception noise has strong influence. As indicated in the expression 2, the feature value includes terms of the reception noise in the denominator and the numerator. In Non Patent Literature 2, the significant feature value can be calculated only when the terms of the reception noise are very small. Thus, accuracy of specifying a radio wave emission source is bad except when a signal-to-noise ratio (SNR) of a received signal is extremely high.

In view of the above circumstance, an example object of the present disclosure is to provide a radio wave feature value computation apparatus, a radio wave emission source identification apparatus, a method therefor, and a program that are able to compute a feature value that is not influenced by multipath fading and is for specifying a radio wave emission source by using nonlinearity steadily present in a wireless communication terminal.

In order to achieve the above object, the present disclosure provides, as a first example aspect, a radio wave feature value computation apparatus. The radio wave feature value computation apparatus includes: a signal detection unit configured to designate, within a fixed signal included in a baseband signal of a received communication wave, an information-1 section and an information-2 section that are two types of signal sections having different communication information and being present in shorter time than fading of the received communication wave changing with time; an information-1 section signal processing unit configured to Fourier-transform and output an information-1 section designated by the signal detection unit within the baseband signal; an information-2 section signal processing unit configured to Fourier-transform and output an information-2 section designated by the signal detection unit within the baseband signal; and a feature value computation unit configured to compute a feature value for identifying an emission source of the communication wave, based on an output of the information-1 section signal processing unit and an output of the information-2 section signal processing unit.

The present disclosure provides, as a second example aspect, a radio wave emission source identification apparatus. The radio wave emission source identification apparatus includes: a signal detection unit configured to designate, within a fixed signal included in a baseband signal of a received communication wave, an information-1 section and an information-2 section that are two types of signal sections having different communication information and being present in shorter time than fading of the received communication wave changing with time; an information-1 section signal processing unit configured to Fourier-transform and output an information-1 section designated by the signal detection unit within the baseband signal; an information-2 section signal processing unit configured to Fourier-transform and output an information-2 section designated by the signal detection unit within the baseband signal; a feature value computation unit configured to compute a feature value, based on an output of the information-1 section signal processing unit and an output of the information-2 section signal processing unit; and an identification unit configured to specify an individual of an emission source of the received communication wave, based on a feature value computed by the feature value computation unit.

The present disclosure provides, as a third example aspect, a radio wave feature value computation method. The radio wave feature value computation method includes: designating, within a fixed signal included in a baseband signal of a received communication wave, an information-1 section and an information-2 section that are two types of signal sections having different communication information and being present in shorter time than fading of the received communication wave changing with time; Fourier-transforming the information-1 section within the baseband signal; Fourier-transforming the information-2 section within the baseband signal; and computing a feature value for identifying an emission source of the communication wave, based on a signal of the Fourier-transformed information-1 section and a signal of the Fourier-transformed information-2 section.

The present disclosure provides, as a fourth example aspect, a radio wave emission source identification method. The radio wave emission source identification method includes: designating, within a fixed signal included in a baseband signal of a received communication wave, an information-1 section and an information-2 section that are two types of signal sections having different communication information and being present in shorter time than fading of the received communication wave changing with time; Fourier-transforming the information-1 section within the baseband signal; Fourier-transforming the information-2 section within the baseband signal; computing a feature value, based on a signal of the Fourier-transformed information-1 section and a signal of the Fourier-transformed information-2 section; and specifying an individual of an emission source of the received communication wave, based on the computed feature value.

The present disclosure provides, as a fifth example aspect, a program (radio wave feature value computation program). The radio wave feature value computation program causes a processor to execute processing including: designating, within a fixed signal included in a baseband signal of a received communication wave, an information-1 section and an information-2 section that are two types of signal sections having different communication information and being present in shorter time than fading of the received communication wave changing with time; Fourier-transforming the information-1 section within the baseband signal; Fourier-transforming the information-2 section within the baseband signal; and computing a feature value for identifying an emission source of the communication wave, based on a signal of the Fourier-transformed information-1 section and a signal of the Fourier-transformed information-2 section.

The present disclosure provides, as a sixth example aspect, a program (radio wave emission source identification program). The radio wave emission source identification program causes a processor to execute processing including: designating, within a fixed signal included in a baseband signal of a received communication wave, an information-1 section and an information-2 section that are two types of signal sections having different communication information and being present in shorter time than fading of the received communication wave changing with time; Fourier-transforming the information-1 section within the baseband signal; Fourier-transforming the information-2 section within the baseband signal; computing a feature value, based on a signal of the Fourier-transformed information-1 section and a signal of the Fourier-transformed information-2 section; and specifying an individual of an emission source of the received communication wave, based on the computed feature value.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

Figure 1:
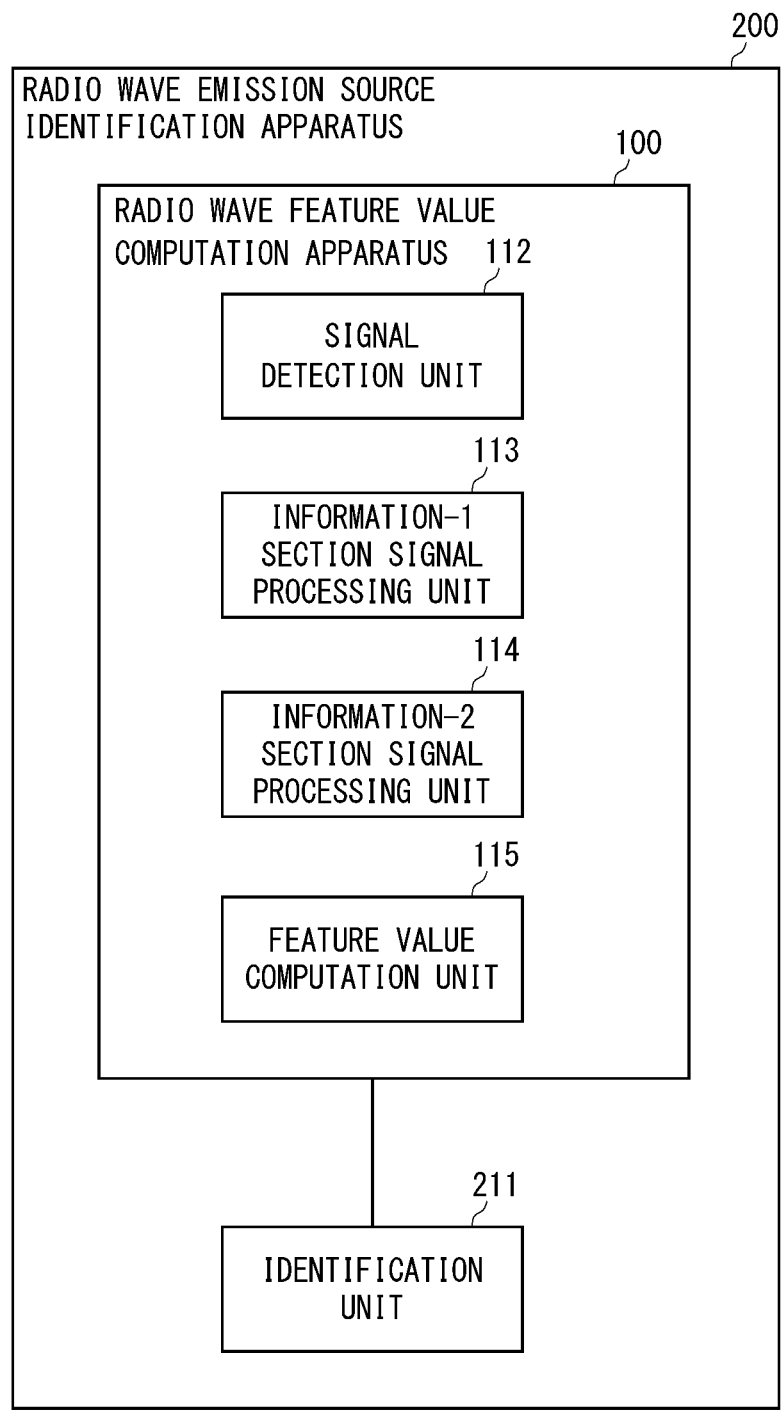
FIG. 1 is a block diagram illustrating a radio wave emission source identification apparatus according to a first example embodiment of the present disclosure.

Hereinafter, example embodiments of the present disclosure will be described in detail with reference to the drawings. Note that, in the example embodiments described below, reference signs in the drawings are added to components for convenience, as an example for aiding understanding, and the description of the example embodiments below is not intended to limit the present disclosure. Note that, in the present description and the drawings, the components capable of being described in a similar way may be assigned with an identical sign to omit duplicated description.

First Embodiment

FIG. 1 is a configuration diagram of a radio wave emission source identification apparatus 200 according to a first example embodiment of the present disclosure. The radio wave emission source identification apparatus 200 includes a radio wave feature value computation apparatus 100 and an identification unit 211. The radio wave feature value computation apparatus 100 includes a signal detection unit 112, an information-1 section signal processing unit 113, an information-2 section signal processing unit 114, and a feature value computation unit 115.

The signal detection unit 112 detects, from a baseband signal of a received radio wave, two types of fixed signal sections that have different communication information and are present in sufficiently shorter time than a time period in which influence of fading fluctuates. The signal detection unit 112 designates the detected two types of fixed signal sections as an information-1 section and an information-2 section, respectively. Herein, a signal length of the information-1 section is the same as a signal length of the information-2 section.

The information-1 section signal processing unit 113 clips, from the baseband signal of the received radio wave, the information-1 section designated by the signal detection unit 112. The information-1 section signal processing unit 113 performs Fourier transform on the clipped information-1 section, and outputs a Fourier-transformed signal. The information-2 section signal processing unit 114 clips, from the baseband signal of the received radio wave, the information-2 section designated by the signal detection unit 112. The information-2 section signal processing unit 114 performs Fourier transform on the clipped information-2 section, and outputs a Fourier-transformed signal.

To the feature value computation unit 115, a signal of the Fourier-transformed information-1 section being output from the information-1 section signal processing unit 113 and a signal of the Fourier-transformed information-2 section being output from the information-2 section signal processing unit 114 are input. The feature value computation unit 115 divides, for each frequency bin, a signal of the Fourier-transformed information-1 section by a signal of the Fourier-transformed information-2 section. The feature value computation unit 115 outputs, to the identification unit 211, a result of division as a feature value.

The identification unit 211 analyzes a feature value being output from the feature value computation unit 115, and specifies an emission source of the received radio wave. The identification unit 211 is configured as, for example, an identification apparatus that performs classification or collation determination by using machine learning, as described in Non Patent Literature 1. The identification unit 211 may be an identification apparatus that performs classification or collation determination based on cosine similarity or a Euclidean distance between a typical value of a feature value and a feature value calculated from the received radio wave.

By employing the above configuration, the radio wave feature value computation apparatus 100 can compute a feature value that is not influenced by multipath fading and is capable of stably specifying a radio wave emission source independently of performance of a wireless communication terminal. Hereinafter, a reason will be described by using mathematical expressions.

The feature value calculated by the radio wave feature value computation apparatus 100 is represented by a mathematical expression as follows.

$$\frac{H_{P1,i} G_{P1,i}(S_{P1}) + N_{P1,i}}{H_{P2,i} G_{P2,i}(S_{P2}) + N_{P2,i}} \qquad (7)$$

Herein, an ideal signal of the information-1 section is denoted by $S_{P1}$, and an ideal signal of the information-2 section is denoted by $S_{P2}$. $G_{P1,i}$ and $G_{P2,i}$ are mathematical expressions indicating nonlinearity of a radio wave emission source in the information-1 section and the information-2 section, respectively. $H_{P1,i}$ and $H_{P2,i}$ are waveform distortions attributable to multipath fading in the information-1 section and the information-2 section, respectively. $N_{P1,i}$ and $N_{P2,i}$ are reception noises in the information-1 section and the information-2 section, respectively. A subscript i indicates a subcarrier number (or a frequency bin number).

Since the information-1 section and the information-2 section are present in extremely shorter time than fluctuation time of multipath fading, it is considered that the following equation 8 can hold.

$$H_{P1,i} = H_{P2,i} \tag{8}$$

When the reception noise is sufficiently small, the feature value calculated by the radio wave feature value computation apparatus 100 can be approximated as the following expression 9.

$$\frac{G_{P1,i}(S_{P1})}{G_{P2,i}(S_{P2})} \tag{9}$$

As can be understood from the expression 9, the feature value calculated by the radio wave feature value computation apparatus 100 has no term of the waveform distortion H attributable to multipath fading. Thus, it can be seen that the feature value is not influenced by the waveform distortion attributable to multipath fading.

The feature value calculated by the radio wave feature value computation apparatus 100 indicated by the above expression 9 is different from the feature value described in Non Patent Literature 2 indicated by the expression 4 in following two points. A first point of difference is that the ideal signal $S_{P1}$ of the information-1 section and the ideal signal $S_{P2}$ of the information-2 section are in a relationship of the following equation 10.

$$S_{P1} \neq S_{P2} \tag{10}$$

A second point of difference is that the mathematical expressions G indicating nonlinearity are assumed to be exactly the same mathematical expression between a denominator and a numerator, and a feature value can be calculated even when the following equation 11 holds.

$$G_{P1,i}(x) = G_{P2,i}(x) \tag{11}$$

Thus, unlike Non Patent Literature 2, the radio wave feature value computation apparatus 100 can stably compute an effective feature value even outside a signal area where a transient response of a radio wave emission source occurs dominantly.

Unlike Non Patent Literature 2, the reason why the radio wave feature value computation apparatus 100 can calculate an effective feature value even when the relationship of the equation 11 holds is that the feature value calculated by the radio wave feature value computation apparatus 100 is based on nonlinearity of a radio wave emission source occurring attributable to an intermodulation distortion. It is known that a static input-output characteristic of an analog circuit used for a wireless communication terminal or the like can be approximated by a Taylor series, and the static input-output characteristic can be represented as $$y(t) = ax(t) + bx^2(t) + cx^3(t) \tag{12}.$$

Herein, y(t) is an output signal, x(t) is an input signal, t is time, and a, b, c, . . . are coefficients of the Taylor series. In the equation 12, second or higher-degree terms represent nonlinearity of an analog circuit. A distortion occurring when the signal x(t) having any bandwidth is input to such an analog circuit is the intermodulation distortion, and, particularly, the intermodulation distortion calculated from a higher odd-degree term occurs in the same frequency band as the input signal x(t).

Even when the static input-output characteristics of an analog circuit represented by the equation 12 are exactly the same, the above intermodulation distortion returns different values when input signals are different as in the expression 10. That is, even when the relationship of the equation 11 holds, the feature value represented by the expression 10 returns different values for each radio wave emission source. Hereinafter, it will be indicated that different nonlinear terms are calculated by computing the output y(t) when two types of different signals are input.

First, for simplicity of discussion, suppose that a signal in which four subcarriers are aligned at equal frequency intervals is used. It is assumed that the subcarriers have frequencies of $f_1$, $f_2$, $f_3$, and $f_4$ and phases of $\theta_1$, $\theta_2$, $\theta_3$, and $\theta_4$. It is assumed that a signal using only two subcarriers of the above and represented by a following equation 13 is input to an analog circuit having the input-output characteristic represented by the equation 12.

$$x(t) = A\{\cos(2\pi f_1 t + \theta_1) + \cos(2\pi f_3 t + \theta_3)\} \tag{13}$$

Herein, when an output y(x) is computed up to a third-degree term and only a component of the frequency $f_1$ is clipped, the following expression 14 is acquired.

$$aA \cdot \cos(2\pi f_1 t + \theta_1) + \frac{9cA^3}{4}\cos(2\pi f_1 t + \theta_1) \tag{14}$$

Then, it is assumed that the input signal is changed to a signal using all of the four subcarriers and a signal represented by a following equation 15 is input to an analog circuit having the input-output characteristic represented by the equation 12.

$$x(t) = A\{\cos(2\pi f_1 t + \theta_1) + \cos(2\pi f_2 t + \theta_2) + \cos(2\pi f_3 t + \theta_3) + \cos(2\pi f_4 t + \theta_4)\} \tag{15}$$

Herein, when an output y(x) is computed up to a third-degree term and only a component of the frequency $f_1$ is clipped, the following expression 16 is acquired.

$$aA \cdot \cos(2\pi f_1 t + \theta_1) + \frac{3cA^3}{4}\{7\cos(2\pi f_1 t + \theta_1) + \cos(2\pi f_1 t + 2\theta_2 - \theta_3) + 2\cos(2\pi f_1 t + \theta_2 + \theta_3 - \theta_4)\} \tag{16}$$

Comparing the expression 14 with the expression 16, it can be seen that second terms have different values. This is a difference in the intermodulation distortion occurring due to different input signals.

As described above, when mutually different two signals are input to an analog circuit, the two input signals generate mutually different nonlinearity distortions, even on a premise that the mathematical expressions G generating nonlinearity distortions are exactly the same. For this reason, unlike Non Patent Literature 2, the radio wave feature value computation apparatus 100 can calculate a feature value capable of stably specifying a radio wave emission source independently of performance of a wireless communication terminal. Furthermore, since the coefficients a, b, c, . . . in the equation 12 are different values depending on an individual of a radio wave emission source, an individual of a radio wave emission source can be specified by distinguishing the feature value calculated by the radio wave feature value computation apparatus 100.

Hereinafter, a signal clipping method when a Wi-Fi preamble signal is used will be described as a specific example. However, the following description is not intended to limit usage of the present disclosure to Wi-Fi. In the first example embodiment, conditions for a signal to be subjected to feature value computation include only two points of:
  (1) There are two types of fixed signals having different information; and
  (2) The two types of fixed signals are present in sufficiently shorter time than a time period in which influence of fading fluctuates. Similar processing can be performed on a signal other than a Wi-Fi preamble signal, as long as the signal meets the conditions.

Figure 2:
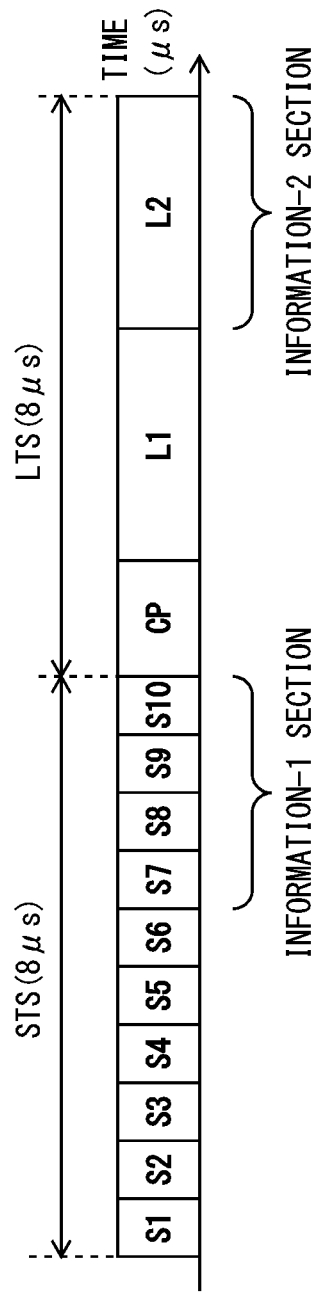
FIG. 2 is a schematic diagram illustrating an example of a method of clipping a Wi-Fi preamble signal according to the first example embodiment.

FIG. 2 is a diagram illustrating one example of a method of designating the information-1 section and the information-2 section when a feature value is calculated from a Wi-Fi preamble signal by using the radio wave feature value computation apparatus 100 according to the first example embodiment. When feature value extraction is performed for a Wi-Fi preamble signal, the information-1 section to be designated by the signal detection unit 112 is a part of an STS signal section, and the information-2 section is a part of an LTS signal section. A Wi-Fi signal is designed in such a way that information on each subcarrier can be extracted by performing fast Fourier transform (FFT) on a signal of 3.2 µs at a sampling rate of 20 M samples per second (sps). Accordingly, a sampling rate of a signal to be processed by the radio wave feature value computation apparatus 100 is set to an integer multiple of 20 Msps, a section of 3.2 µs is designated in both the information-1 section and the information-2 section, and the designated section is Fourier-transformed, thereby performing feature value computation for each subcarrier.

The signal detection unit 112 can designate, as the information-1 section, a section having a range of 3.2 µs from any time later than 0.8 µs from a beginning in the STS signal section. In the example in FIG. 2, a signal section S7 to S10 (3.2 µs) out of S1 to S10 included in the STS (8 µs) is designated as the information-1 section. Further, the signal detection unit 112 can designate, as the information-2 section, a section having a range of 3.2 µs from any time later than 0.8 µs from a beginning in the LTS signal section. In the example in FIG. 2, a signal section L2 (3.2 µs) out of CP, L1, and L2 included in the LTS (8 µs) is designated as the information-2 section. The reason why a signal section from the beginning to 0.8 µs is not used is to eliminate influence of inter-symbol interference from a calculation result of a feature value.

Figure 3:
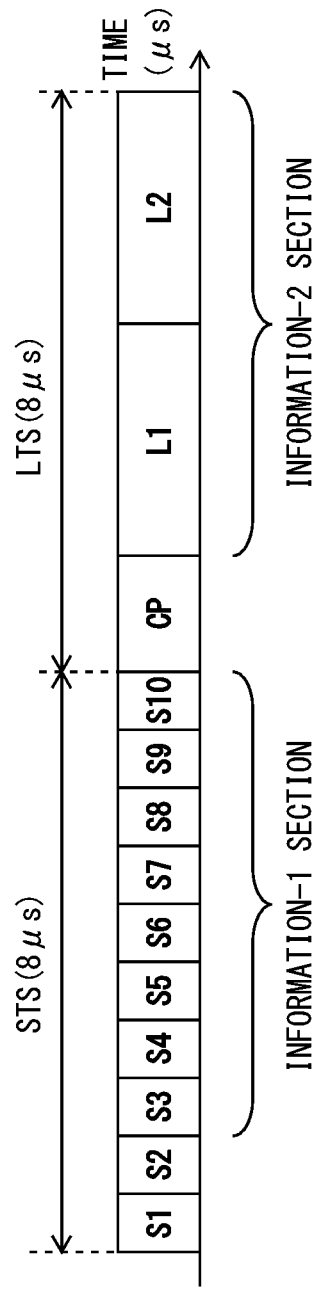
FIG. 3 is a schematic diagram illustrating another example of a method of clipping a Wi-Fi preamble signal according to the first example embodiment.

FIG. 3 is a diagram illustrating another example of a method of designating the information-1 section and the information-2 section when a feature value is calculated from a Wi-Fi preamble signal by using the radio wave feature value computation apparatus 100 according to the first example embodiment. In the example in FIG. 3, the signal detection unit 112 designates a signal section of 6.4 µs in the STS as the information-1 section, and designates a signal section of 6.4 µs in the LTS as the information-2 section. The signal detection unit 112 can designate, as the information-1 section, a section having a range of 6.4 µs from any time later than 0.8 µs from a beginning in the STS signal section. Further, the signal detection unit 112 can designate, as the information-2 section, a section having a range of 6.4 µs from any time later than 0.8 µs from a beginning in the LTS signal section. The reason why a signal section from the beginning to 0.8 µs is not used is to eliminate influence of inter-symbol interference from a calculation result of a feature value.

The information-1 section signal processing unit 113 according to the present example embodiment may output a result of dividing a Fourier-transformed signal of the information-1 section designated by the signal detection unit 112 by a Fourier-transformed signal of an ideal signal of the information-1 section. Similarly, the information-2 section signal processing unit 114 may output a result of dividing a Fourier-transformed signal of the information-2 section designated by the signal detection unit 112 by a Fourier-transformed signal of an ideal signal of the information-2 section.

For example, when a Wi-Fi signal is used, an ideal value for each subcarrier of the STS is sqrt(13/6)×(0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0). Herein, sqrt(13/6) is a square root of thirteen-sixth. The information-1 section signal processing unit 113 may divide a Fourier-transformed signal of the information-1 section designated by the signal detection unit 112 by the above ideal value for each subcarrier, and may output a result of the division. Further, an ideal value for each subcarrier of the LTS is (1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1). The information-2 section signal processing unit 114 may divide a Fourier-transformed signal of the information-2 section designated by the signal detection unit 112 by the above ideal value for each subcarrier, and may output a result of the division. In that case, the information-1 section signal processing unit 113 and the information-2 section signal processing unit 114 may output a result of computation selectively using only a subcarrier having a non-zero ideal value.

Figure 4:
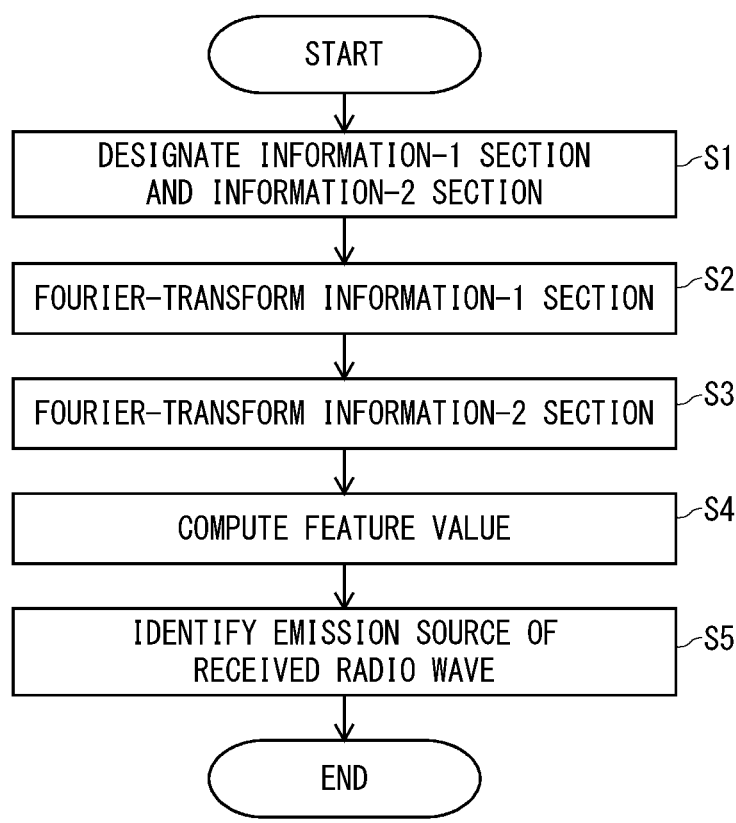
FIG. 4 is a flowchart illustrating an operation procedure of the radio wave emission source identification apparatus according to the first example embodiment.

Next, an operation procedure will be described. FIG. 4 illustrates an operation procedure (radio wave emission source identification method) of the radio wave emission source identification apparatus 200. The signal detection unit 112 detects two types of fixed signal sections from a baseband signal of a received radio wave. The signal detection unit 112 designates two types of fixed signal sections as an information-1 section and an information-2 section, respectively (Step S1).

The information-1 section signal processing unit 113 clips the information-1 section from the baseband signal of the received radio wave. The information-1 section signal processing unit 113 Fourier-transforms the clipped information-1 section (Step S2). Further, the information-2 section signal processing unit 114 clips the information-2 section from the baseband signal of the received radio wave. The information-2 section signal processing unit 114 Fourier-transforms the clipped information-2 section (Step S3), and outputs a Fourier-transformed signal.

The feature value computation unit 115 computes a feature value, based on a signal of the information-1 section Fourier-transformed by the information-1 section signal processing unit 113 and a signal of the information-2 section Fourier-transformed by the information-2 section signal processing unit 114 (Step S4). In Step S4, for example, the feature value computation unit 115 divides, for each frequency bin, a signal of the Fourier-transformed information-1 section by a signal of the Fourier-transformed information-2 section. Steps S1 to S4 are associated with an operation procedure (radio wave feature value computation method) of the radio wave feature value computation apparatus 100.

The identification unit 211 specifies an emission source of the received radio wave (communication wave), based on the feature value computed by the feature value computation unit 115 (Step S5). In Step S5, the identification unit 211 can specify a radio wave emission source from the feature value by using any approach. The feature value according to the present example embodiment is not influenced by multipath fading and is independent of performance of a wireless communication terminal. Thus, the radio wave emission source identification apparatus 200 can stably specify a radio wave emission source without being influenced by multipath fading and independently of performance of a wireless communication terminal.

Note that, the radio wave emission source identification apparatus 200 according to the present example embodiment may be configured as an unillustrated apparatus that includes a processor, a memory, and a storage device. The storage device stores a computer program on which processing of the radio wave emission source identification method according to the present example embodiment is implemented. The processor reads the computer program from the storage device into the memory, and executes the computer program. The processor executes the computer program, thereby achieving at least part of the functions of the signal detection unit 112, the information-1 section signal processing unit 113, the information-2 section signal processing unit 114, the feature value computation unit 115, and the identification unit 211.

In the radio wave emission source identification apparatus 200, at least part of the signal detection unit 112, the information-1 section signal processing unit 113, the information-2 section signal processing unit 114, the feature value computation unit 115, and the identification unit 211 may be achieved by dedicated hardware. Further, the whole or part of the components may be achieved by a general-purpose or dedicated circuitry, a processor, or a combination thereof. These may be configured by a single chip, or may be configured by a plurality of chips connected via a bus. The whole or part of the components may be achieved by a combination of the above-described circuitry and the like and a program. Further, a central processing unit (CPU), a graphics processing unit (GPU), a field-programmable gate array (FPGA), or the like can be used as a processor.

Second Embodiment

Figure 5:
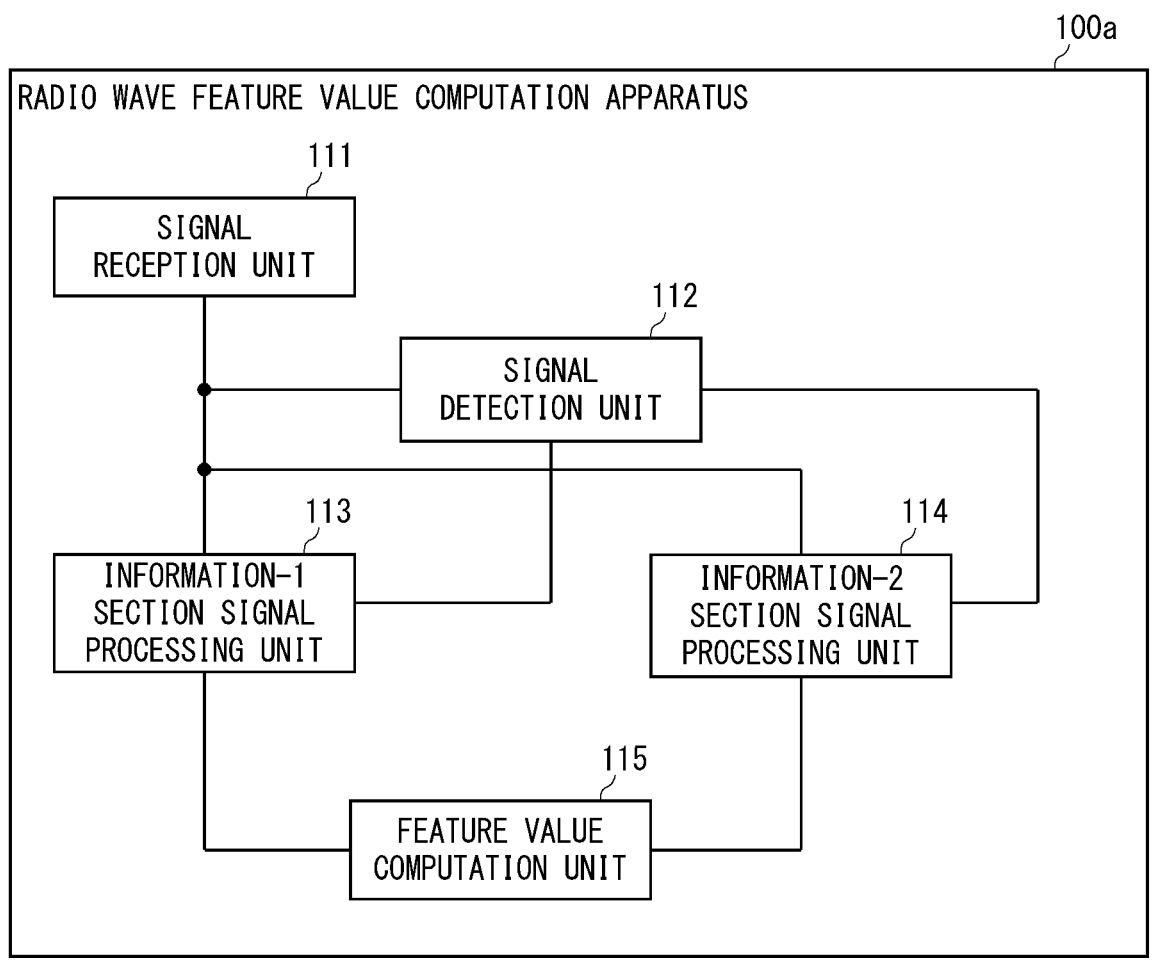
FIG. 5 is a block diagram illustrating a radio wave feature value computation apparatus according to a second example embodiment of the present disclosure.

A second example embodiment of the present disclosure is a specific example of the radio wave feature value computation apparatus 100 according to the first example embodiment. FIG. 5 is a block diagram illustrating a configuration of a radio wave feature value computation apparatus 100a according to the second example embodiment. The radio wave feature value computation apparatus 100a includes a signal reception unit 111, a signal detection unit 112, an information-1 section signal processing unit 113, an information-2 section signal processing unit 114, and a feature value computation unit 115.

The signal reception unit 111 receives a communication radio wave, transforms the received radio wave into a baseband signal, and outputs the baseband signal. The signal detection unit 112 detects, from the baseband signal of the received radio wave output by the signal reception unit 111, two types of fixed signal sections that have different communication information and are present in sufficiently shorter time than a time period in which influence of fading fluctuates. The signal detection unit 112 designates the detected two types of fixed signal sections as an information-1 section and an information-2 section, respectively.

The information-1 section signal processing unit 113 clips, from the baseband signal of the received radio wave, the information-1 section designated by the signal detection unit 112. The information-1 section signal processing unit 113 performs Fourier transform on the clipped information-1 section, and outputs a Fourier-transformed signal. The information-2 section signal processing unit 114 clips, from the baseband signal of the received radio wave, the information-2 section designated by the signal detection unit 112. The information-2 section signal processing unit 114 performs Fourier transform on the clipped information-2 section, and outputs a Fourier-transformed signal. The feature value computation unit 115 outputs, as a feature value, a result of dividing an output of the information-1 section signal processing unit 113 by an output of the information-2 section signal processing unit 114 for each frequency bin.

Third Embodiment

Figure 6:
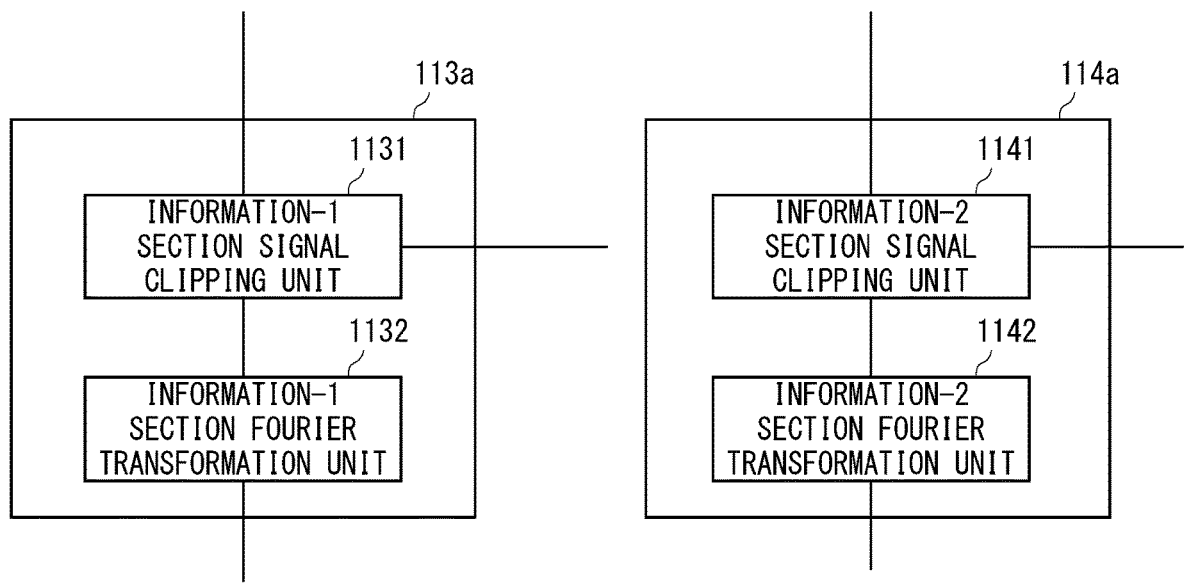
FIG. 6 is a block diagram illustrating a part of signal processing according to a third example embodiment of the present disclosure.

A third example embodiment of the present disclosure is a specific example of the information-1 section signal processing unit 113 and the information-2 section signal processing unit 114 according to the second example embodiment. FIG. 6 is a block diagram illustrating a configuration of an information-1 section signal processing unit 113a and an information-2 section signal processing unit 114a. The information-1 section signal processing unit 113a includes an information-1 section signal clipping unit 1131 and an information-1 section Fourier transformation unit 1132. The information-2 section signal processing unit 114a includes an information-2 section signal clipping unit 1141 and an information-2 section Fourier transformation unit 1142.

To the information-1 section signal clipping unit 1131, a baseband signal of a received radio wave output from the signal reception unit 111 is input. The information-1 section signal clipping unit 1131 clips, from the input baseband signal, an information-1 section designated by the signal detection unit 112. The information-1 section signal clipping unit 1131 outputs a signal of the clipped information-1 section to the information-1 section Fourier transformation unit 1132. The information-1 section Fourier transformation unit 1132 performs Fourier transform on the signal of the information-1 section, and outputs the Fourier-transformed signal to the feature value computation unit 115.

To the information-2 section signal clipping unit 1141, a baseband signal of a received radio wave output from the signal reception unit 111 is input. The information-2 section signal clipping unit 1141 clips, from the input baseband signal, an information-2 section designated by the signal detection unit 112. The information-2 section signal clipping unit 1141 outputs a signal of the clipped information-2 section to the information-2 section Fourier transformation unit 1142. The information-2 section Fourier transformation unit 1142 performs Fourier transform on the signal of the information-2 section, and outputs the Fourier-transformed signal to the feature value computation unit 115.

When feature value computation is performed on a Wi-Fi preamble signal, for example, the information-1 section signal clipping unit 1131 clips a signal of S7 to S10 in the STS illustrated in FIG. 2 as a signal of the information-1 section. Further, the information-2 section signal clipping unit 1141 clips a signal of L2 in the LTS illustrated in FIG. 2 as a signal of the information-2 section. Alternatively, the information-1 section signal clipping unit 1131 clips a signal of S3 to S10 in the STS illustrated in FIG. 3 as a signal of the information-1 section. The information-2 section signal clipping unit 1141 clips a signal of L1 and L2 in the LTS illustrated in FIG. 3 as a signal of the information-2 section. The information-1 section signal clipping unit 1131 may clip, as the information-1 section, a section having a range of 3.2 µs or 6.4 µs from any time later than 0.8 µs from a beginning in the STS signal section. The information-2 section signal clipping unit 1141 may clip, as the information-2 section, a section having a range of 3.2 µs or 6.4 µs from any time later than 0.8 µs from a beginning in the LTS signal section.

Fourth Embodiment

A fourth example embodiment of the present disclosure is a specific example of the information-1 section signal processing unit 113 and the information-2 section signal processing unit 114 according to the second example embodiment, which is different from the third example embodiment. The present example embodiment is effective especially when a baseband signal of a received radio wave is a fixed signal in which a single signal pattern is repeated a plurality of times in each of an information-1 section and an information-2 section.

Figure 7:
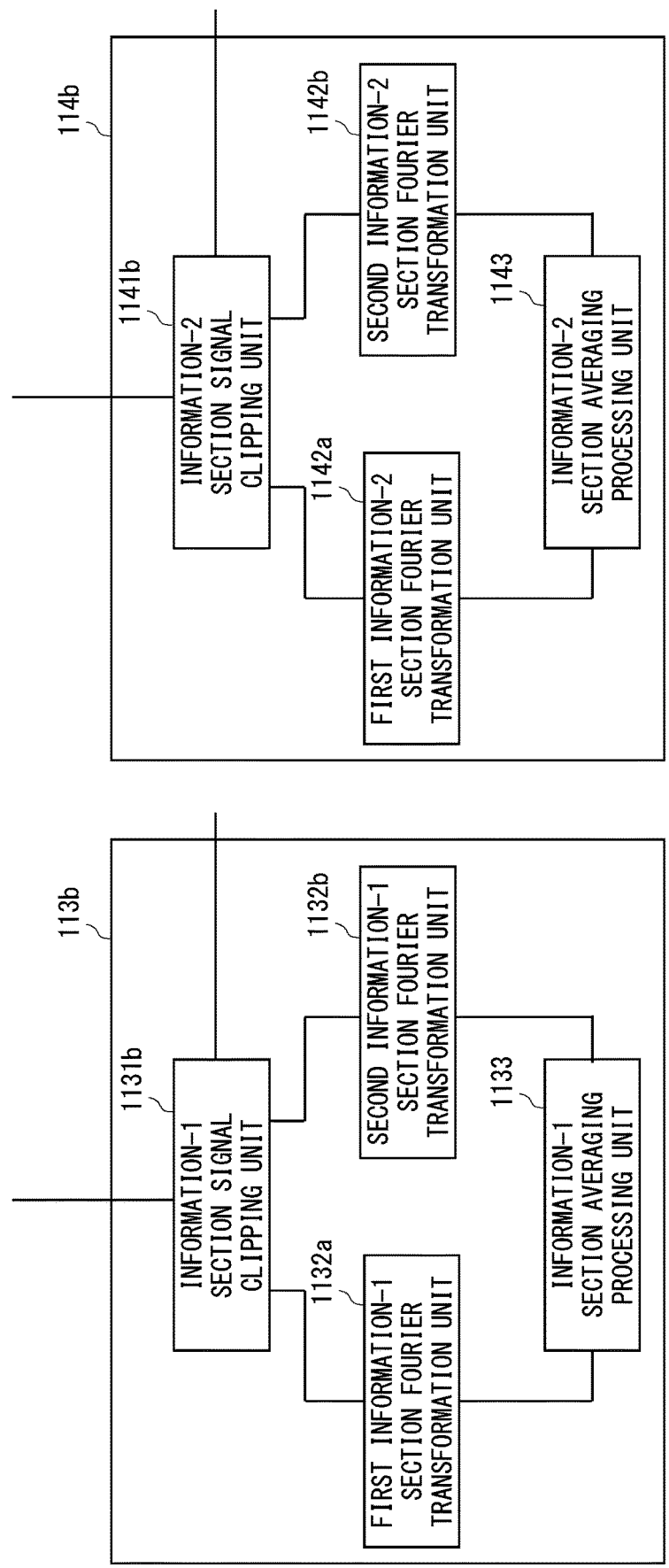
FIG. 7 is a block diagram illustrating a part of signal processing according to a fourth example embodiment of the present disclosure.

FIG. 7 is a block diagram illustrating a configuration of an information-1 section signal processing unit 113b and an information-2 section signal processing unit 114b used in the radio wave feature value computation apparatus 100a (see FIG. 5) according to the present example embodiment. The information-1 section signal processing unit 113b includes an information-1 section signal clipping unit 1131b, a first information-1 section Fourier transformation unit 1132a, a second information-1 section Fourier transformation unit 1132b, and an information-1 section averaging processing unit 1133. The information-2 section signal processing unit 114b includes an information-2 section signal clipping unit 1141b, a first information-2 section Fourier transformation unit 1142a, a second information-2 section Fourier transformation unit 1142b, and an information-2 section averaging processing unit 1143.

To the information-1 section signal clipping unit 1131b, a baseband signal of a received radio wave is input from the signal reception unit 111. The information-1 section signal clipping unit 1131b clips, from the input baseband signal, a signal of an information-1 section designated by the signal detection unit 112. The information-1 section signal clipping unit 1131b according to the present example embodiment clips any signals for two cycles from a fixed signal in which an identical signal pattern is repeated a plurality of times in the information-1 section, separately as a first information-1 section and a second information-1 section.

The first information-1 section Fourier transformation unit 1132a performs Fourier transform on a signal of the first information-1 section clipped by the information-1 section signal clipping unit 1131b, and outputs the Fourier-transformed signal. The second information-1 section Fourier transformation unit 1132b performs Fourier transform on a signal of the second information-1 section clipped by the information-1 section signal clipping unit 1131b, and outputs the Fourier-transformed signal.

The information-1 section averaging processing unit 1133 computes, for each frequency bin, an average between a signal output by the first information-1 section Fourier transformation unit 1132a and a signal output by the second information-1 section Fourier transformation unit 1132b. The information-1 section averaging processing unit 1133 outputs an average of two signals to the feature value computation unit 115. The information-1 section averaging processing unit 1133 may add up two signals for each frequency bin, instead of computing an average of two signals.

To the information-2 section signal clipping unit 1141b, a baseband signal of a received radio wave is input from the signal reception unit 111. The information-2 section signal clipping unit 1141b clips, from the input baseband signal, a signal of an information-2 section designated by the signal detection unit 112. The information-2 section signal clipping unit 1141b according to the present example embodiment clips any signals for two cycles from a fixed signal in which an identical signal pattern is repeated a plurality of times in the information-2 section, separately as a first information-2 section and a second information-2 section.

The first information-2 section Fourier transformation unit 1142a performs Fourier transform on the first information-2 section clipped by the information-2 section signal clipping unit 1141b, and outputs a Fourier-transformed signal. The second information-2 section Fourier transformation unit 1142b performs Fourier transform on the second information-2 section clipped by the information-2 section signal clipping unit 1141b, and outputs a Fourier-transformed signal.

The information-2 section averaging processing unit 1143 computes, for each frequency bin, an average between a signal output by the first information-2 section Fourier transformation unit 1142a and a signal output by the second information-2 section Fourier transformation unit 1142b. The information-2 section averaging processing unit 1143 outputs an average of two signals to the feature value computation unit 115. The information-2 section averaging processing unit 1143 may add up two signals for each frequency bin, instead of computing an average of two signals.

The first information-1 section, the second information-1 section, the first information-2 section, and the second information-2 section according to the present example embodiment all have the same signal length. The radio wave feature value computation apparatus 100a according to the present example embodiment can extract a feature value capable of acquiring high accuracy of specifying a radio wave emission source even when an SNR of a received signal is low. The reason is that a fixed signal in which a single signal pattern is repeated a plurality of times is averaged in each of the information-1 section and the information-2 section, thereby enabling noise reduction.

In Non Patent Literature 2, a change (transient response) of a waveform distortion occurring in a fixed signal in which a single signal pattern is repeated a plurality of times is computed as a feature value. However, the transient response disappears when averaging similar to the present example embodiment is performed in Non Patent Literature 2. Therefore, in Non Patent Literature 2, even when a method similar to the present example embodiment is applied, a feature value capable of acquiring high accuracy of specifying a radio wave emission source even when an SNR of a received signal is low cannot be extracted.

Hereinafter, a signal clipping method when a Wi-Fi preamble signal is used will be described as a specific example. However, the following description is not intended to limit usage of the present disclosure to Wi-Fi.

In the first example embodiment, conditions for a signal to be subjected to feature value computation include three points of:

(1) There are two types of fixed signals having different information;

(2) The two types of fixed signals are present in sufficiently shorter time than a time period in which influence of fading fluctuates; and (3) Each of the two types of fixed signals is a signal in which a unique signal pattern is repeated a plurality of times. The present example embodiment also can extract a feature value by using a signal other than a Wi-Fi preamble signal, as long as the signal meets the conditions.

Figure 8:
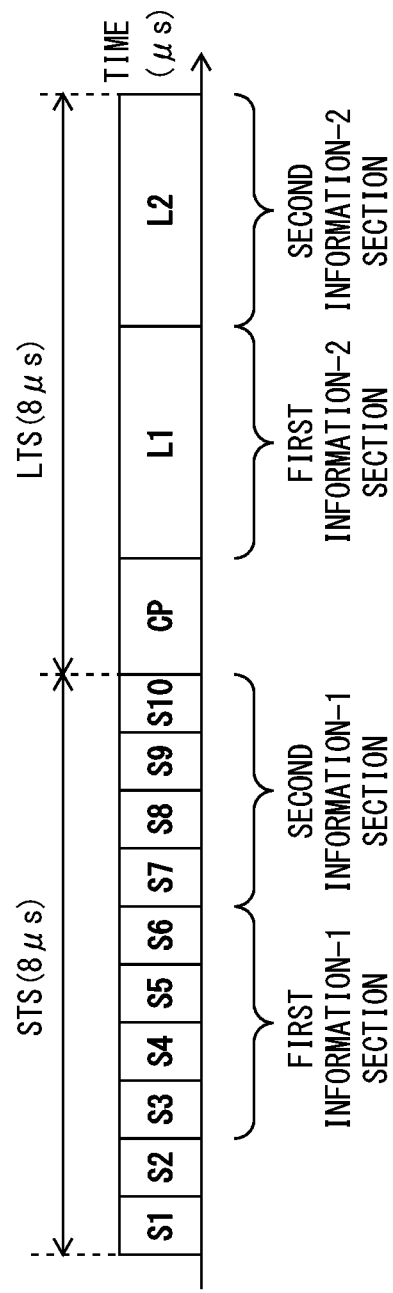
FIG. 8 is a schematic diagram illustrating an example of a method of clipping a Wi-Fi preamble signal according to the fourth example embodiment.

FIG. 8 is a diagram illustrating one example of a method of specifying the first information-1 section, the second information-1 section, the first information-2 section, and the second information-2 section when a feature value is computed from a Wi-Fi preamble signal by using the radio wave feature value computation apparatus 100a according to the present example embodiment. The information-1 section signal clipping unit 1131b clips signals of exclusive sections of 3.2 μs in the STS as signals of the first information-1 section and the second information-1 section. In the example in FIG. 8, the signal clipping unit 1131b clips a signal of sections S3 to S6 in the STS as a signal of the first information-1 section, and clips a signal of S7 to S10 as a signal of the second information-1 section. Further, the information-2 section signal clipping unit 1141b clips signals of exclusive sections of 3.2 μs in the LTS as signals of the first information-2 section and the second information-2 section. In the example in FIG. 8, the signal clipping unit 1141b clips a signal of a section L1 in the LTS as a signal of the first information-2 section, and clips a signal of a section L2 as a signal of the second information-2 section.

The signal clipping unit 1131b may clip, as the first information-1 section and the second information-1 section, two sections having a range of 3.2 μs from any time later than 0.8 μs from a beginning in the STS signal section. Further, the signal clipping unit 1141b may clip, as the first information-2 section and the second information-2 section, two sections having a range of 3.2 μs from any time later than 0.8 μs from a beginning in the LTS signal section. Note, when an interval of time is allowed between the first information-1 section and the second information-1 section, it is necessary to correct a phase rotation for the allowed interval of time. Similarly, when an interval of time is allowed between the first information-2 section and the second information-2 section, it is necessary to correct a phase rotation for the allowed interval of time.

Fifth Embodiment

Figure 9:
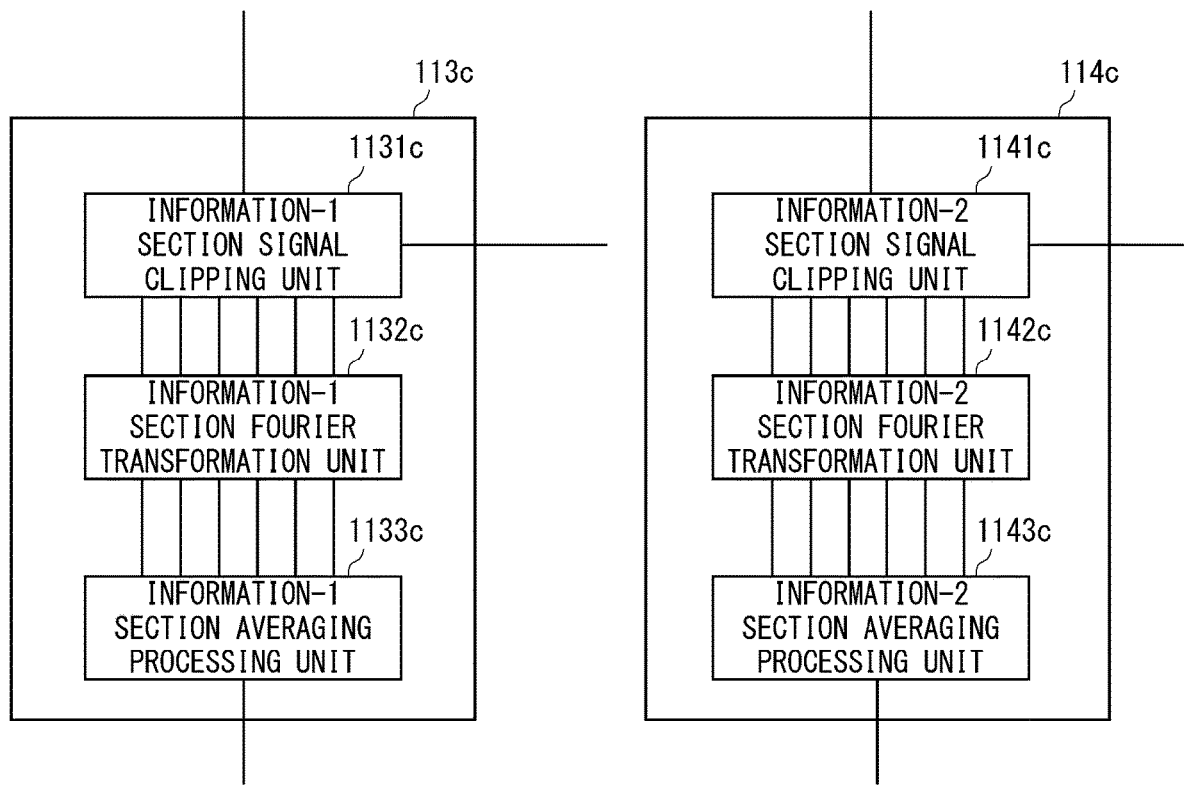
FIG. 9 is a block diagram illustrating a part of signal processing according to a fifth example embodiment of the present disclosure.

A fifth example embodiment of the present disclosure is a specific example of the information-1 section signal processing unit 113 and the information-2 section signal processing unit 114 according to the second example embodiment, which is different from the third and fourth example embodiments. FIG. 9 is a block diagram illustrating a configuration of an information-1 section signal processing unit 113c and an information-2 section signal processing unit 114c. The information-1 section signal processing unit 113c according to the present example embodiment includes an information-1 section signal clipping unit 1131c, an information-1 section Fourier transformation unit 1132c, and an information-1 section averaging processing unit 1133c. Further, the information-2 section signal processing unit 114c includes an information-2 section signal clipping unit 1141c, an information-2 section Fourier transformation unit 1142c, and an information-2 section averaging processing unit 1143c.

The present example embodiment provides a signal processing method based on a premise of a structure of a Wi-Fi preamble signal. The information-1 section signal clipping unit 1131c according to the present example embodiment clips, from a baseband signal output by the signal reception unit 111 (see FIG. 5), an information-1 section designated by the signal detection unit 112. At this time, the information-1 section signal clipping unit 1131c clips, as a plurality of information-1 sections, a plurality of signal sections, beginning times of which are shifted by a predetermined time each. The information-2 section signal clipping unit 1141c clips, from a baseband signal output by the signal reception unit 111, an information-2 section designated by the signal detection unit 112. At this time, the information-2 section signal clipping unit 1141c clips, as a plurality of information-2 sections, a plurality of signal sections, beginning times of which are shifted by a predetermined time each.

Figure 10:
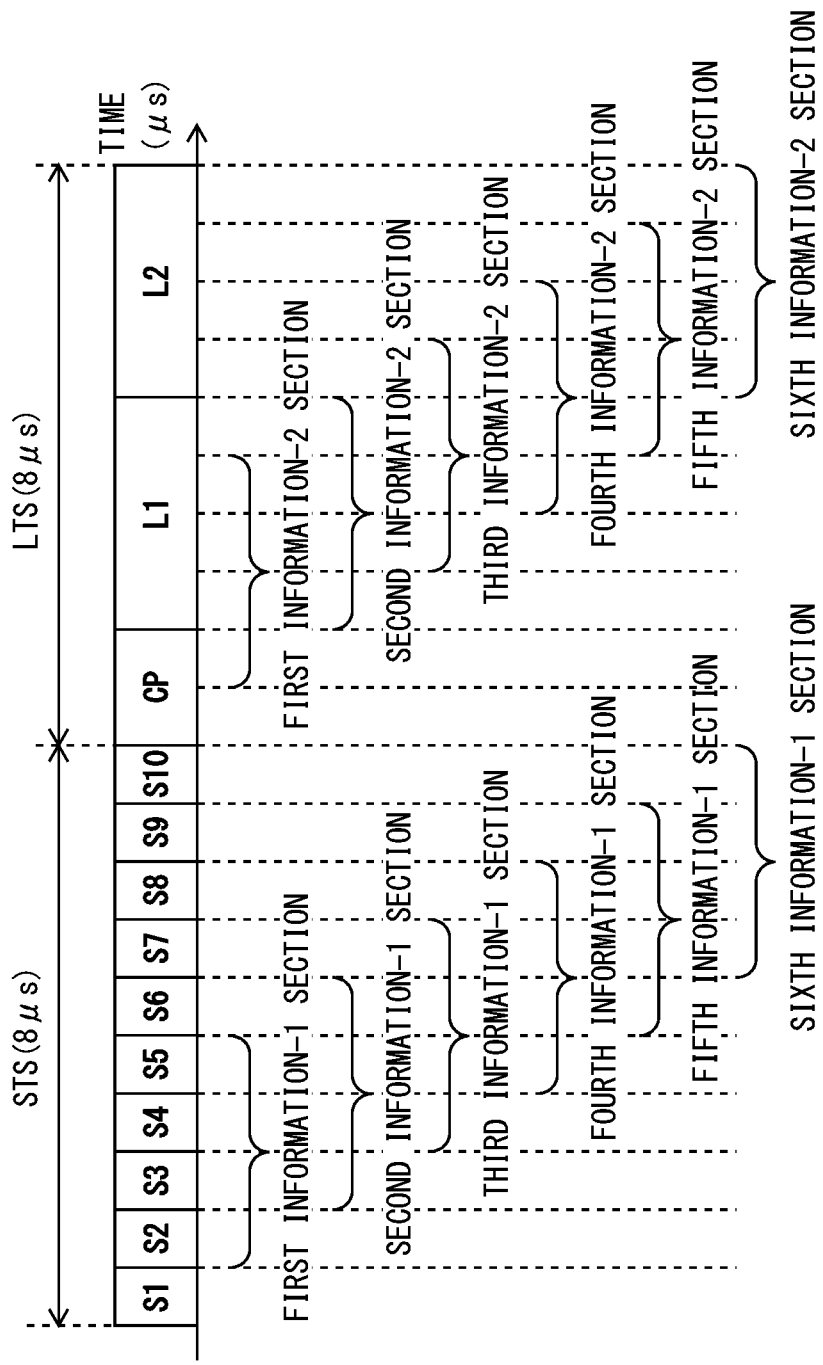
FIG. 10 is a schematic diagram illustrating an example of a method of clipping a Wi-Fi preamble signal according to the fifth example embodiment.

FIG. 10 is a diagram illustrating a method of designating a plurality of information-1 sections and a plurality of information-2 sections when a feature value is computed from a Wi-Fi preamble signal by using the radio wave feature value computation apparatus 100a according to the fourth example embodiment. For example, the information-1 section signal clipping unit 1131c clips, in the STS signal section, a first information-1 section to a sixth information-1 section illustrated in FIG. 10. That is, the information-1 section signal clipping unit 1131c clips, beginning from a time after a lapse of 0.8 μs from starting of the STS, six sections of 3.2 μs as a first information-1 section to a sixth information-1 section, while shifting beginning times of the sections by 0.8 μs each. In other words, the information-1 section signal clipping unit 1131c performs clipping of a section of 3.2 μs six times, beginning from a time after a lapse of 0.8 μs from starting of the STS, while shifting beginning times of signal sections to be clipped by 0.8 μs each.

Further, the information-2 section signal clipping unit 1141c clips, in the LTS signal section, a first information-2 section to a sixth information-2 section illustrated in FIG. 10. That is, the information-2 section signal clipping unit 1141c clips, beginning from a time after a lapse of 0.8 μs from starting of the LTS, six sections of 3.2 μs as a first information-2 section to a sixth information-2 section, while shifting beginning times of the sections by 0.8 μs each. In other words, the information-2 section signal clipping unit 1141c performs clipping of a section of 3.2 μs six times, beginning from a time after a lapse of 0.8 μs from starting of the LTS, while shifting beginning times of signal sections to be clipped by 0.8 μs each.

The information-1 section Fourier transformation unit 1132c performs Fourier transform individually on each of the first information-1 section to the sixth information-1 section clipped by the information-1 section signal clipping unit 1131c. The information-1 section averaging processing unit 1133c computes, for each frequency bin, an average of the first information-1 section to the sixth information-1 section Fourier-transformed by the information-1 section Fourier transformation unit 1132c. The information-1 section averaging processing unit 1133c outputs, to the feature value computation unit 115 (see FIG. 5), the average of the Fourier-transformed first information-1 section to the sixth information-1 section computed for each frequency bin.

The information-2 section Fourier transformation unit 1142c performs Fourier transform individually on each of the first information-2 section to the sixth information-2 section clipped by the information-2 section signal clipping unit 1141c. The information-2 section averaging processing unit 1143c computes, for each frequency bin, an average of the first information-2 section to the sixth information-2 section Fourier-transformed by the information-2 section Fourier transformation unit 1142c. The information-2 section averaging processing unit 1143c outputs, to the feature value computation unit 115, the average of the Fourier-transformed first information-2 section to the sixth information-2 section computed for each frequency bin. The information-2 section averaging processing unit 1143c may perform, in computation of an average, correction of adding a rotation of minus 90 degrees each to signals of the information-2 sections, since phases of the clipped signal sections are rotated by 90 degrees each.

Note that, the information-1 section averaging processing unit 1133c may add up signals of the six information-1 sections for each frequency bin, instead of computing an average of signals of the six information-1 sections for each frequency bin. Further, the information-1 section signal processing unit 113c does not need to compute an average for all of a plurality of clipped information-1 sections, and may compute an average for some of a plurality of clipped information-1 sections. For example, the information-1 section Fourier transformation unit 1132c may perform Fourier transform on some of the six information-1 sections. The information-1 section averaging processing unit 1133c may compute an average of some of the Fourier-transformed six information-1 sections for each frequency bin. That is, although the information-1 section signal processing unit 113c can use up to six signal sections, the information-1 section signal processing unit 113c does not necessarily need to perform Fourier transform and averaging processing for all of the six signal sections. The information-1 section signal processing unit 113c can perform Fourier transform and averaging processing on two or more sections selected from the clipped first information-1 section to the sixth information-1 section.

Similarly, the information-2 section averaging processing unit 1143c may add up signals of the six information-2 sections for each frequency bin, instead of computing an average of signals of the six information-2 sections for each frequency bin. Further, the information-2 section signal processing unit 114c does not need to compute an average for all of a plurality of clipped information-2 sections, and may compute an average for some of a plurality of clipped information-2 sections. For example, the information-2 section Fourier transformation unit 1142c may perform Fourier transform on some of the six information-2 sections. The information-2 section averaging processing unit 1143c may compute an average of some of the Fourier-transformed six information-2 sections for each frequency bin. That is, although the information-2 section signal processing unit 114c can use up to six signal sections, the information-2 section signal processing unit 114c does not necessarily need to perform Fourier transform and averaging processing for all of the six signal sections. The information-2 section signal processing unit 114c can perform Fourier transform and averaging processing on two or more sections selected from the clipped first information-2 section to the sixth information-2 section.

The radio wave feature value computation apparatus 100a according to the present example embodiment can extract a feature value capable of acquiring high accuracy of specifying a radio wave emission source even when an SNR of a received signal is low. The reason is that a fixed signal in which a single signal pattern is repeated a plurality of times is averaged in each of the information-1 section and the information-2 section, thereby enabling noise reduction.

Sixth Embodiment

Figure 11:
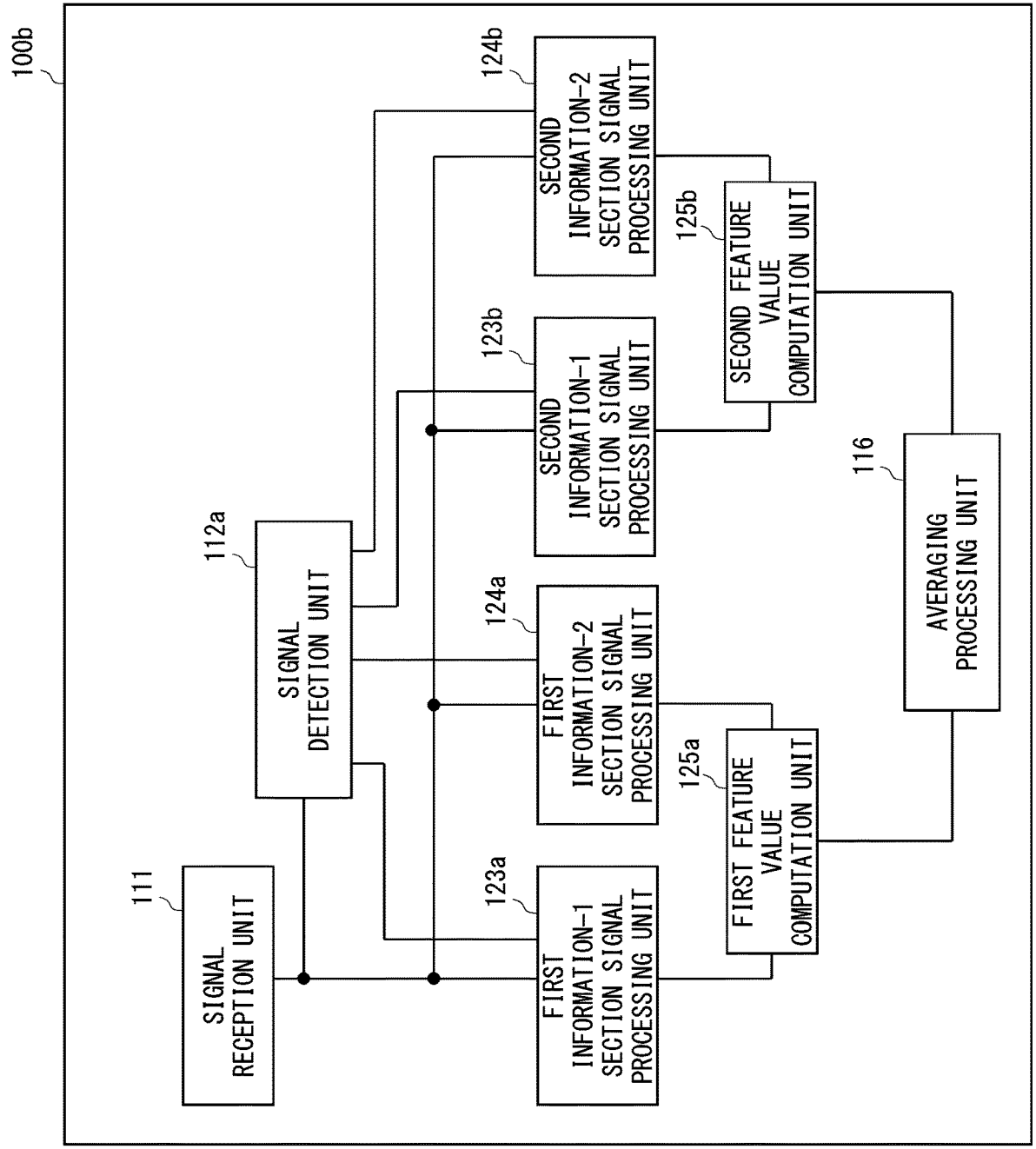
FIG. 11 is a block diagram illustrating a radio wave feature value computation apparatus according to a sixth example embodiment of the present disclosure.

A sixth example embodiment of the present disclosure is a specific example of the radio wave feature value computation apparatus 100 according to the first example embodiment, which is different from the second example embodiment. FIG. 11 is a block diagram illustrating a configuration of a radio wave feature value computation apparatus 100b according to the present example embodiment. The radio wave feature value computation apparatus 100b includes a signal reception unit 111, a signal detection unit 112a, a first information-1 section signal processing unit 123a, a second information-1 section signal processing unit 123b, a first information-2 section signal processing unit 124a, a second information-2 section signal processing unit 124b, a first feature value computation unit 125a, a second feature value computation unit 125b, and an averaging processing unit 116.

Note that, the configuration of the radio wave feature value computation apparatus 100b according to the present example embodiment can be regarded as a configuration in which the information-1 section signal processing unit 113 (see FIG. 1) according to the first example embodiment includes the first information-1 section signal processing unit 123a and the second information-1 section signal processing unit 123b. Further, the configuration of the radio wave feature value computation apparatus 100b can be regarded as a configuration in which the information-2 section signal processing unit 114 according to the first example embodiment includes the first information-2 section signal processing unit 124a and the second information-2 section signal processing unit 124b. Furthermore, the configuration of the radio wave feature value computation apparatus 100b can be regarded as a configuration in which the feature value computation unit 115 according to the first example embodiment includes the first feature value computation unit 125a and the second feature value computation unit 125b and the averaging processing unit 116.

The signal reception unit 111 receives a communication radio wave, and transforms the received radio wave into a baseband signal. The signal detection unit 112a detects, from the baseband signal of the received radio wave transformed by the signal reception unit 111, two types of fixed signal sections that have different communication information and are present in sufficiently shorter time than a time period in which influence of fading fluctuates. The signal detection unit 112a designates the detected two types of fixed signal sections as an information-1 section and an information-2 section, respectively. The information-1 section and the information-2 section according to the present example embodiment have a signal structure in which a single signal pattern is repeated a plurality of times. The signal detection unit 112a designates any two cycles in the information-1 section distinctively as a first information-1 section and a second information-1 section. Further, the signal detection unit 112a designates any two cycles in the information-2 section distinctively as a first information-2 section and a second information-2 section.

The first information-1 section signal processing unit 123a clips, from the baseband signal of the received radio wave, a signal of the first information-1 section designated by the signal detection unit 112a, and performs Fourier transform on the clipped signal of the first information-1 section. The second information-1 section signal processing unit 123b clips, from the baseband signal of the received radio wave, the second information-1 section designated by the signal detection unit 112a, and performs Fourier transform on a signal of the clipped second information-1 section. The first information-2 section signal processing unit 124a clips, from the baseband signal of the received radio wave, the first information-2 section designated by the signal detection unit 112a, and performs Fourier transform on a signal of the clipped first information-2 section. The second information-2 section signal processing unit 124b clips, from the baseband signal of the received radio wave, the second information-2 section designated by the signal detection unit 112a, and performs Fourier transform on a signal of the clipped second information-2 section.

The first feature value computation unit 125a divides, for each frequency bin, the first information-1 section Fourier-transformed by the first information-1 section signal processing unit 123a by the first information-2 section Fourier-transformed by the first information-2 section signal processing unit 124a. The first feature value computation unit 125a outputs a result of division as a first feature value. The second feature value computation unit 125b divides, for each frequency bin, the second information-1 section Fourier-transformed by the second information-1 section signal processing unit 123b by the second information-2 section Fourier-transformed by the second information-2 section signal processing unit 124b. The second feature value computation unit 125b outputs a result of division as a second feature value. The averaging processing unit 116 computes, for each frequency bin, an average between the first feature value output by the first feature value computation unit 125a and the second feature value output by the second feature value computation unit 125b. The averaging processing unit 116 outputs a result of averaging processing as a final feature value.

When feature value computation according to the sixth example embodiment is performed on a Wi-Fi preamble signal, a method of selecting the first information-1 section, the second information-1 section, the first information-2 section, and the second information-2 section is similar to that illustrated in FIG. 8. The sixth example embodiment has a configuration, based on the configuration of the fourth example embodiment, in which feature value computation and averaging processing are switched in order.

The present example embodiment may have a configuration, based on the configuration of the fifth example embodiment, in which feature value computation and averaging processing are switched in order. In that case, a first information-1 section signal processing unit and a first information-2 section signal processing unit perform Fourier transform respectively on the first information-1 section and the first information-2 section illustrated in FIG. 10, and a first feature value computation unit divides Fourier-transformed two signals for each frequency bin. Further, a second information-1 section signal processing unit and a second information-2 section signal processing unit perform Fourier transform respectively on the second information-1 section and the second information-2 section illustrated in FIG. 10, and a second feature value computation unit divides Fourier-transformed two signals for each frequency bin. A third information-1 section signal processing unit and a third information-2 section signal processing unit perform Fourier transform respectively on the third information-1 section and the third information-2 section illustrated in FIG. 10, and a third feature value computation unit divides Fourier-transformed two signals for each frequency bin. A fourth information-1 section signal processing unit and a fourth information-2 section signal processing unit perform Fourier transform respectively on the fourth information-1 section and the fourth information-2 section illustrated in FIG. 10, and a fourth feature value computation unit divides Fourier-transformed two signals for each frequency bin. A fifth information-1 section signal processing unit and a fifth information-2 section signal processing unit perform Fourier transform respectively on the fifth information-1 section and the fifth information-2 section illustrated in FIG. 10, and a fifth feature value computation unit divides Fourier-transformed two signals for each frequency bin. A sixth information-1 section signal processing unit and a sixth information-2 section signal processing unit perform Fourier transform respectively on the sixth information-1 section and the sixth information-2 section illustrated in FIG. 10, and a sixth feature value computation unit divides Fourier-transformed two signals for each frequency bin. It is also possible that the averaging processing unit 116 performs averaging processing on outputs of the first feature value computation unit to the sixth feature value computation unit for each frequency bin, and computes a result thereof as a feature value.

Furthermore, as also described in the fifth example embodiment, when six information-1 sections and six information-2 sections are clipped, the radio wave feature value computation apparatus 100b according to the present example embodiment does not need to compute a feature value by using all of the six information-1 sections and the six information-2 sections. The radio wave feature value computation apparatus 100b can also calculate a feature value by using some of the first information-1 section to the sixth information-1 section and the first information-2 section to the sixth information-2 section illustrated in FIG. 10. That is, although the radio wave feature value computation apparatus 100b can use up to six signal sections, the radio wave feature value computation apparatus 100b does not necessarily need to perform Fourier transform and division for all of the six signal sections. The radio wave feature value computation apparatus 100b may perform Fourier transform and division on signals of two or more sections selected from the clipped first information-1 section to the sixth information-1 section and the first information-2 section to the sixth information-2 section, and may perform averaging processing to calculate a feature value.

The radio wave feature value computation apparatus 100b according to the present example embodiment can extract a feature value capable of acquiring high accuracy of specifying a radio wave emission source even when an SNR of a received signal is low. The reason is that a plurality of feature values are generated by using a fixed signal in which a single signal pattern is repeated a plurality of times and are averaged, thereby enabling noise reduction.

Seventh Embodiment

Figure 12:
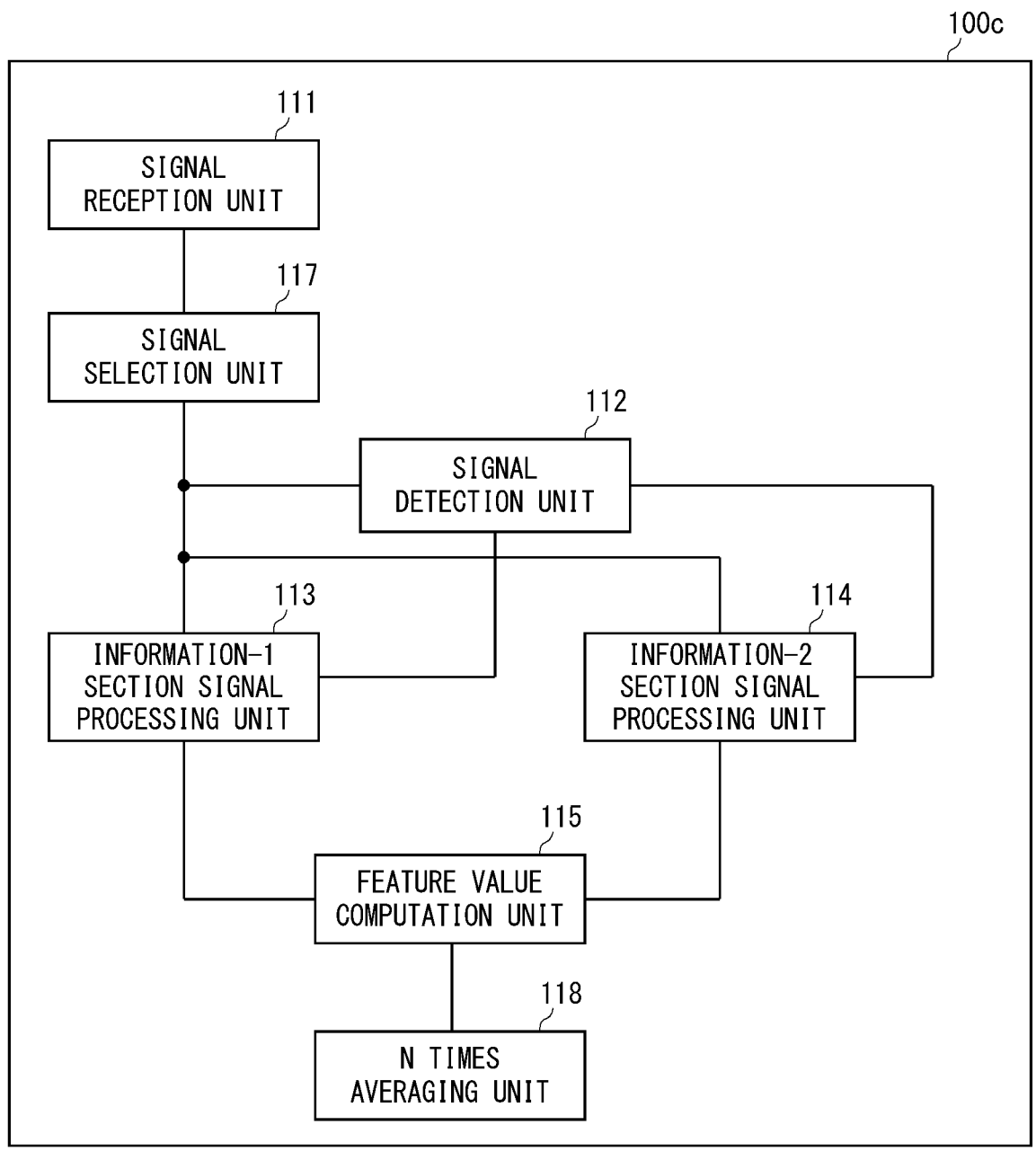
FIG. 12 is a block diagram illustrating a radio wave feature value computation apparatus according to a seventh example embodiment of the present disclosure.

A seventh example embodiment of the present disclosure is a specific example of the radio wave feature value computation apparatus 100 according to the first example embodiment, which is different from the second and sixth example embodiments. FIG. 12 is a block diagram illustrating a configuration of a radio wave feature value computation apparatus 100c according to the seventh example embodiment. The radio wave feature value computation apparatus 100c includes a signal reception unit 111, a signal selection unit 117, a signal detection unit 112, an information-1 section signal processing unit 113, an information-2 section signal processing unit 114, a feature value computation unit 115, and an N times averaging unit 118.

The signal reception unit 111 receives a communication radio wave, and transforms the received radio wave into a baseband signal. The signal selection unit 117 selects and outputs, within the baseband signal transformed by the signal reception unit 111, only a signal output from one specific individual. The signal detection unit 112 detects, from the baseband signal selected by the signal selection unit 117, two types of fixed signal sections that have different communication information and are present in sufficiently shorter time than a time period in which influence of fading fluctuates. The signal selection unit 117 designates the detected two types of fixed signal sections as an information-1 section and an information-2 section, respectively.

The information-1 section signal processing unit 113 clips, from the baseband signal selected by the signal selection unit 117, the information-1 section designated by the signal detection unit 112, and performs Fourier transform on a signal of the clipped information-1 section. The information-2 section signal processing unit 114 clips, from the baseband signal selected by the signal selection unit 117, the information-2 section designated by the signal detection unit 112, and performs Fourier transform on a signal of the clipped information-2 section.

The feature value computation unit 115 divides, for each frequency bin, the information-1 section Fourier-transformed by the information-1 section signal processing unit 113 by the information-2 section Fourier-transformed by the information-2 section signal processing unit 114, and outputs a result thereof. The N times averaging unit 118 averages output signals for a plurality of times of the feature value computation unit 115 for each frequency bin, and outputs an averaged signal as a feature value. For example, the N times averaging unit 118 averages output signals for N times of the feature value computation unit 115, where N is any natural number, and outputs an average value of the output signals of the feature value computation unit 115 as a feature value.

The configuration according to the present example embodiment is similar to the configuration in which a feature value output by the radio wave feature value computation apparatus 100a according to the second example embodiment is averaged by using N frames measured at different times. The configuration of the information-1 section signal processing unit 113 and the information-2 section signal processing unit 114 according to the present example embodiment may be similar to the configuration of the information-1 section signal processing unit 113 and the information-2 section signal processing unit 114 according to the third to fifth example embodiments.

Further, it is possible that a feature value output by the averaging processing unit 116 (see FIG. 1) is averaged N times also in the sixth example embodiment, similarly to the present example embodiment. In this case, similarly to the configuration of the radio wave feature value computation apparatus 100c according to the present example embodiment, the signal selection unit 117 may be arranged at a position posterior to the signal reception unit 111 and prior to the signal detection unit 112, the first information-1 section signal processing unit 123a, the second information-1 section signal processing unit 123b, the first information-2 section signal processing unit 124a, and the second information-2 section signal processing unit 124b. Further, the N times averaging unit 118 may be arranged posterior to the averaging processing unit 116 to perform averaging processing on output signals for N times of the averaging processing unit 116.

Eighth Embodiment

Figure 13:
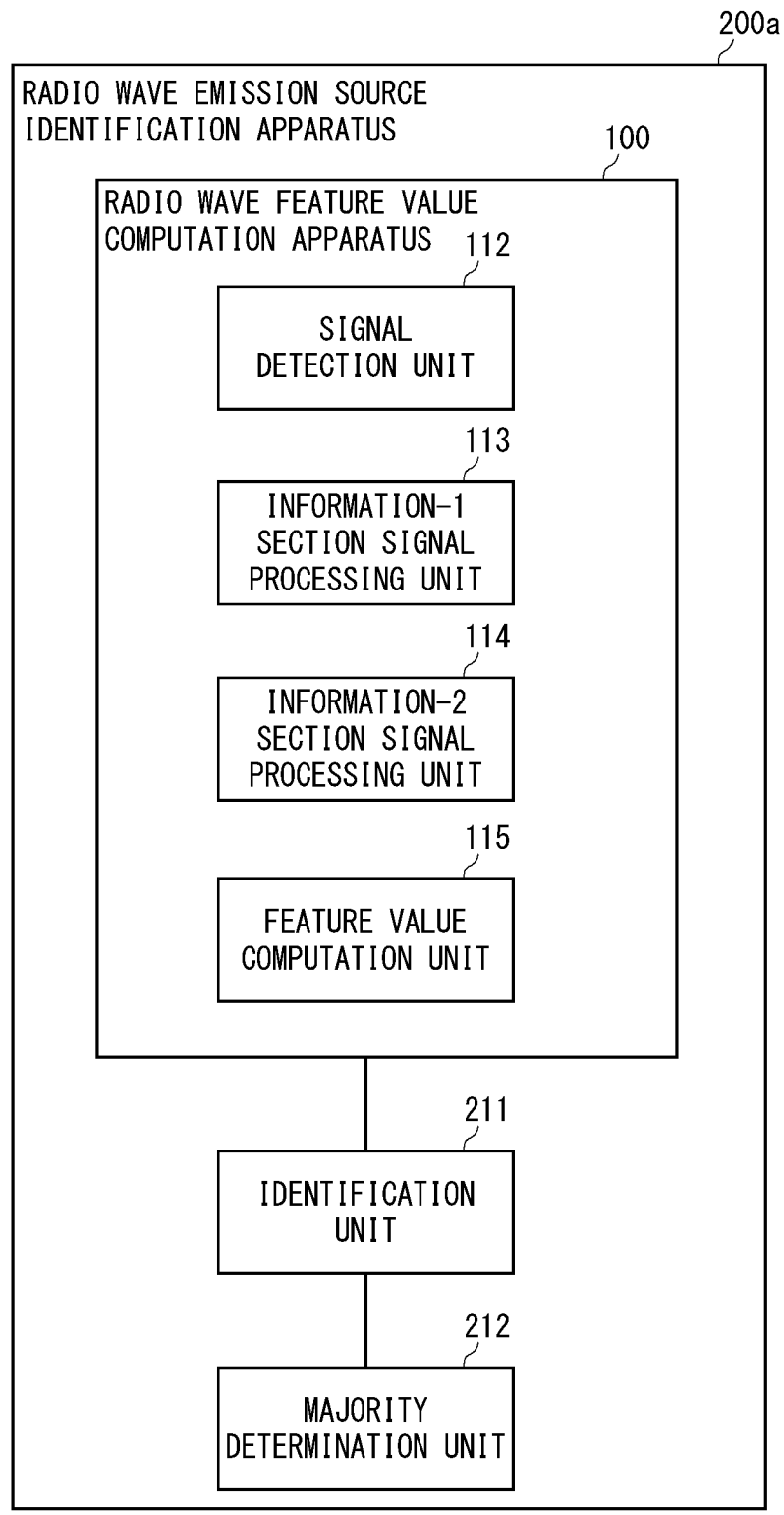
FIG. 13 is a block diagram illustrating a radio wave feature value computation apparatus according to an eighth example embodiment of the present disclosure.
Figure 14:
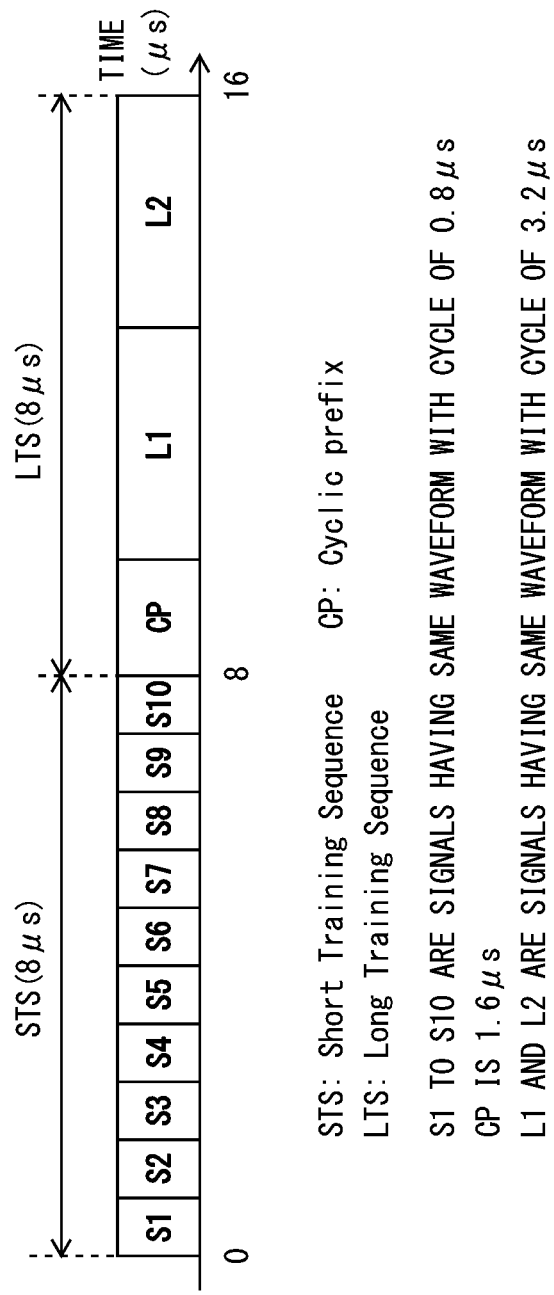
FIG. 14 is a schematic diagram illustrating a structure of a Wi-Fi preamble signal.
Figure 15:
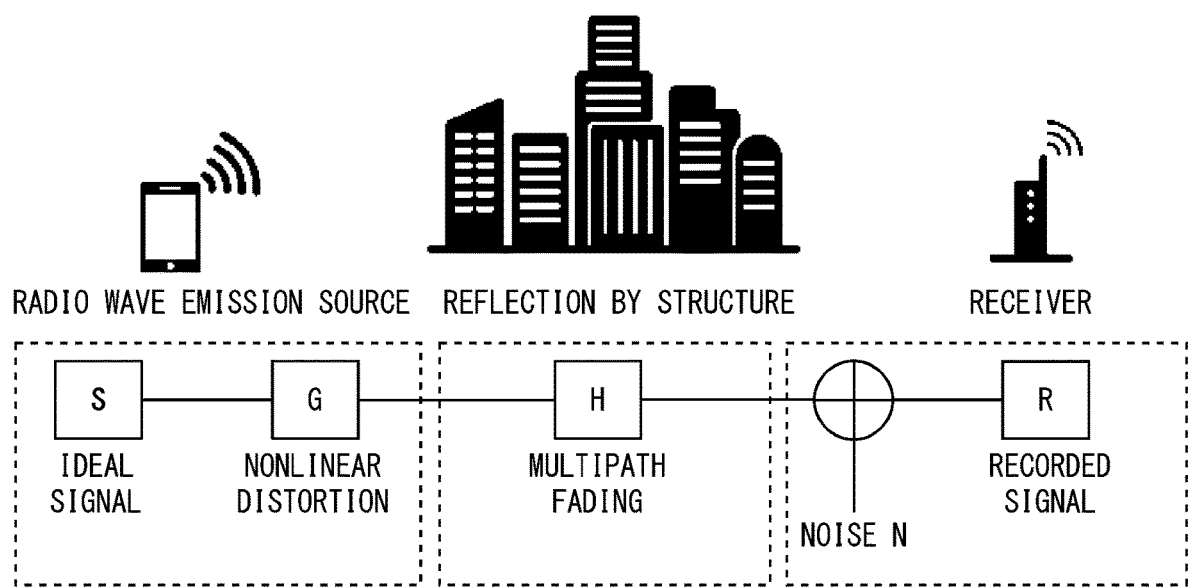
FIG. 15 is a schematic diagram illustrating how a distortion component is applied to a communication radio wave.

FIG. 13 is a configuration diagram according to an eighth example embodiment of the present disclosure. The present example embodiment provides a radio wave emission source identification apparatus 200a that performs identification of a radio wave emission source by using a feature value calculated by using the second to seventh example embodiments. The radio wave emission source identification apparatus 200a includes a radio wave feature value computation apparatus 100, an identification unit 211, and a majority determination unit 212.

The radio wave feature value computation apparatus 100 calculates a feature value from a received communication radio wave, as described in the first to seventh example embodiments. The identification unit 211 analyzes a feature value being output from the radio wave feature value computation apparatus 100, and specifies an emission source of the received radio wave. The identification unit 211 is configured as, for example, an identification apparatus that performs classification or collation determination by using machine learning, as described in Non Patent Literature 1. Alternatively, the identification unit 211 may be an identification apparatus that performs classification or collation determination based on cosine similarity or a Euclidean distance between a typical value of a feature value and a feature value calculated from the received radio wave. The majority determination unit (determination unit) 212 acquires identification results (specification results) of the identification unit 211 for any natural number M times, and determines a radio wave emission source, based on the acquired identification results for M times. For example, the majority determination unit 212 outputs, as an identification result of the radio wave emission source identification apparatus 200, a radio wave emission source specified the most by the identification unit 211 in the acquired identification results for M times.

The radio wave emission source identification apparatus 200a according to the present example embodiment determines a wireless communication terminal of a radio wave emission source, based on a feature value calculated by using the first to seventh example embodiments. Further, the identification unit 211 according to the present example embodiment identifies a radio wave emission source for any natural number M times, and determines a terminal responded the largest number of times therein as a final identification result. By doing so, the radio wave emission source identification apparatus 200a can stably specify a radio wave emission source independently of performance of a wireless communication terminal.

The radio wave feature value computation apparatus 100 according to the present example embodiment desirably analyzes only a signal output from one specific individual. That is, the radio wave feature value computation apparatus 100 desirably includes, prior to the signal detection unit 112, the information-1 section signal processing unit 113, and the information-2 section signal processing unit 114, a processing unit including a function similar to the signal selection unit 117 described in the seventh example embodiment and selects only a signal output from one specific individual. Alternatively, the radio wave feature value computation apparatus 100 desirably avoids receiving radio waves of a plurality of terminals simultaneously, by receiving a short-range radio wave limitedly, using an antenna with high directivity, or the like.

Figure 16:
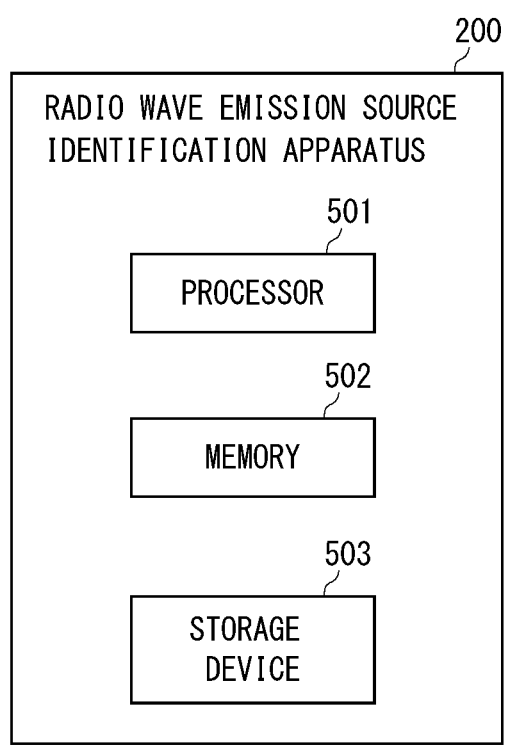
FIG. 16 is a block diagram illustrating a configuration example of the radio wave emission source identification apparatus.

The radio wave feature value computation apparatus 100 or the radio wave emission source identification apparatus 200 according to the present disclosure may be configured as an apparatus that includes at least one processor, at least one memory, and a storage device. FIG. 16 illustrates a configuration example of the radio wave emission source identification apparatus 200. In the radio wave emission source identification apparatus 200, a storage device 503 stores a computer program on which processing of the radio wave emission source identification method according to the present disclosure is implemented. A processor 501 loads the computer program from the storage device 503 into a memory 502, and executes the computer program. The processor 501 executes the computer program loaded into the memory 502, thereby achieving at least part of the functions of the radio wave feature value computation apparatus 100, the identification unit 211, and the majority determination unit 212.

The program includes instructions (or software codes) that, when loaded into a computer, cause the computer to perform one or more of the functions described in the embodiments. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Alternatively, each of the radio wave feature value computation apparatus 100, the identification unit 211, and the majority determination unit 212 may be achieved by dedicated hardware. Further, the whole or part of the radio wave feature value computation apparatus 100, the identification unit 211, and the majority determination unit 212 may be achieved by a general-purpose or dedicated circuitry, a processor, and the like, or by a combination thereof. These may be configured by a single chip, or may be configured by a plurality of chips connected via a bus. The whole or part of the radio wave feature value computation apparatus 100, the identification unit 211, and the majority determination unit 212 may be achieved by a combination of the above-described circuitry and the like and a program. Further, a CPU, a GPU, an FPGA, or the like can be used as a processor.

The above described example embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)

A radio wave feature value computation apparatus including:
 a signal detection unit configured to designate, within a fixed signal included in a baseband signal of a received communication wave, an information-1 section and an information-2 section that are two types of signal sections having different communication information and being present in shorter time than fading of the received communication wave changing with time;
 an information-1 section signal processing unit configured to perform Fourier transform on and output an information-1 section designated by the signal detection unit within the baseband signal;
 an information-2 section signal processing unit configured to perform Fourier transform on and output an information-2 section designated by the signal detection unit within the baseband signal; and
 a feature value computation unit configured to compute a feature value for identifying an emission source of the communication wave, based on an output of the information-1 section signal processing unit and an output of the information-2 section signal processing unit.

(Supplementary Note 2)

The radio wave feature value computation apparatus according to Supplementary note 1, wherein the feature value computation unit computes the feature value by dividing an output of the information-1 section signal processing unit by an output of the information-2 section signal processing unit for each frequency bin.

(Supplementary Note 3)

The radio wave feature value computation apparatus according to Supplementary note 1 or 2, wherein
 the information-1 section signal processing unit includes:
  an information-1 section signal clipping unit configured to clip the information-1 section from the baseband signal; and
  an information-1 section Fourier transformation unit configured to perform Fourier transform on a signal of an information-1 section clipped by the information-1 section signal clipping unit, and
 the information-2 section signal processing unit includes:
  an information-2 section signal clipping unit configured to clip the information-2 section from the baseband signal; and
  an information-2 section Fourier transformation unit configured to perform Fourier transform on a signal of an information-2 section clipped by the information-2 section signal clipping unit.

(Supplementary Note 4)

The radio wave feature value computation apparatus according to Supplementary note 3, wherein
 the fixed signal includes a single signal pattern that is repeated a plurality of times in the information-1 section and a single signal pattern that is repeated a plurality of times in the information-2 section,
 the information-1 section signal clipping unit clips two cycles of a first information-1 section and a second information-1 section from a single signal pattern that is repeated a plurality of times in the information-1 section, the information-1 section Fourier transformation unit includes a first information-1 section Fourier transformation unit configured to perform Fourier transform on a signal of the first information-1 section and a second information-1 section Fourier transformation unit configured to perform Fourier transform on a signal of the second information-1 section, the information-1 section signal processing unit further includes an information-1 section averaging processing unit configured to compute, for each frequency bin, an average between a first information-1 section Fourier-transformed by the first information-1 section Fourier transformation unit and a second information-1 section Fourier-transformed by the second information-1 section Fourier transformation unit, the information-2 section signal clipping unit clips two cycles of a first information-2 section and a second information-2 section from a single signal pattern that is repeated a plurality of times in the information-2 section, the information-2 section Fourier transformation unit includes a first information-2 section Fourier transformation unit configured to perform Fourier transform on a signal of the first information-2 section and a second information-2 section Fourier transformation unit configured to perform Fourier transform on a signal of the second information-2 section, the information-2 section signal processing unit further includes an information-2 section averaging processing unit configured to compute, for each frequency bin, an average between a first information-2 section Fourier-transformed by the first information-2 section Fourier transformation unit and a second information-2 section Fourier-transformed by the second information-2 section Fourier transformation unit, and a signal length of the first information-1 section, a signal length of the second information-1 section, a signal length of the first information-2 section, and a signal length of the second information-2 section are equal to one another.

(Supplementary Note 5)

The radio wave feature value computation apparatus according to Supplementary note 3, wherein
  the fixed signal includes a single signal pattern that is repeated a plurality of times in the information-1 section and a single signal pattern that is repeated a plurality of times in the information-2 section,
  the information-1 section signal clipping unit clips two cycles of a first information-1 section and a second information-1 section from a single signal pattern that is repeated a plurality of times in the information-1 section,
  the information-1 section Fourier transformation unit includes a first information-1 section Fourier transformation unit configured to perform Fourier transform on a signal of the first information-1 section and a second information-1 section Fourier transformation unit configured to perform Fourier transform on a signal of the second information-1 section,
  the information-2 section signal clipping unit clips two cycles of a first information-2 section and a second information-2 section from a single signal pattern that is repeated a plurality of times in the information-2 section,
  the information-2 section Fourier transformation unit includes a first information-2 section Fourier transformation unit configured to perform Fourier transform on a signal of the first information-2 section and a second information-2 section Fourier transformation unit configured to perform Fourier transform on a signal of the second information-2 section,
  the feature value computation unit includes:
    a first feature value computation unit configured to compute a first feature value by dividing, for each frequency bin, a first information-1 section Fourier-transformed by the first information-1 section Fourier transformation unit, by a first information-2 section Fourier-transformed by the first information-2 section Fourier transformation unit;
    a second feature value computation unit configured to compute a second feature value by dividing, for each frequency bin, a second information-1 section Fourier-transformed by the second information-1 section Fourier transformation unit, by a second information-2 section Fourier-transformed by the second information-2 section Fourier transformation unit; and
    an averaging processing unit configured to compute, for each frequency bin, an average between the first feature value and the second feature value and output the computed average as the feature value, and
  a signal length of the first information-1 section, a signal length of the second information-1 section, a signal length of the first information-2 section, and a signal length of the second information-2 section are equal to one another.

(Supplementary Note 6)

The radio wave feature value computation apparatus according to any one of Supplementary notes 1 to 5, wherein
  the fixed signal is a Wi-Fi standard preamble signal, and
  the information-1 section is included in a short training sequence (STS) and the information-2 section is included in a long training sequence (LTS).

(Supplementary Note 7)

The radio wave feature value computation apparatus according to Supplementary note 1 or 2, wherein
  the fixed signal is a Wi-Fi standard preamble signal,
  the information-1 section is included in a short training sequence (STS) and the information-2 section is included in a long training sequence (LTS),
  the information-1 section signal processing unit includes:
    an information-1 section signal clipping unit configured to clip, beginning from a time after a lapse of 0.8 µs from starting of the STS, six sections of first to sixth information-1 sections that are sections of 3.2 µs shifted by 0.8 µs each;
    an information-1 section Fourier transformation unit configured to individually perform Fourier transform on and output signals of six sections clipped by the information-1 section signal clipping unit; and
    an information-1 section averaging processing unit configured to compute an average value for each frequency bin by using signals of at least two sections out of individually Fourier-transformed signals of six sections output by the information-1 section Fourier transformation unit, and
  the information-2 section signal processing unit includes:
    an information-2 section signal clipping unit configured to clip, beginning from a time after a lapse of 0.8 µs from starting of the LTS, six sections of first to sixth information-2 sections that are sections of 3.2 µs shifted by 0.8 µs each;
    an information-2 section Fourier transformation unit configured to individually perform Fourier transform on and output signals of six sections clipped by the information-2 section signal clipping unit; and an information-2 section averaging processing unit configured to compute an average value for each frequency bin by using signals of at least two sections out of individually Fourier-transformed signals of six sections output by the information-2 section Fourier transformation unit.

(Supplementary Note 8)

The radio wave feature value computation apparatus according to Supplementary note 1 or 2, wherein the fixed signal is a Wi-Fi standard preamble signal, the information-1 section is included in a short training sequence (STS) and the information-2 section is included in a long training sequence (LTS), the information-1 section signal processing unit includes:
an information-1 section signal clipping unit configured to clip, beginning from a time after a lapse of 0.8 μs from starting of the STS, six sections of first to sixth information-1 sections that are sections of 3.2 μs shifted by 0.8 μs each; and
an information-1 section Fourier transformation unit configured to individually perform Fourier transform on and output signals of six sections clipped by the information-1 section signal clipping unit, the information-2 section signal processing unit includes:
an information-2 section signal clipping unit configured to clip, beginning from a time after a lapse of 0.8 μs from starting of the LTS, six sections of first to sixth information-2 sections that are sections of 3.2 μs shifted by 0.8 μs each; and
an information-2 section Fourier transformation unit configured to individually perform Fourier transform on and output signals of six sections clipped by the information-2 section signal clipping unit, and the feature value computation unit computes a feature value in each of six sections by dividing each of signals for six sections output by the information-1 section signal processing unit, by each of signals for six sections output by the information-2 section signal processing unit, computes, for each frequency bin, an average of feature values of at least two sections among feature values of the six sections, and outputs the computed average as the feature value.

(Supplementary Note 9)

The radio wave feature value computation apparatus according to Supplementary note 8, wherein the feature value computation unit computes a feature value of a first information-1 section by dividing a signal of the first information-1 section by a signal of a first information-2 section for each frequency bin, computes a feature value of a second information-1 section by dividing a signal of the second information-1 section by a signal of a second information-2 section for each frequency bin, computes a feature value of a third information-1 section by dividing a signal of the third information-1 section by a signal of a third information-2 section for each frequency bin, computes a feature value of a fourth information-1 section by dividing a signal of the fourth information-1 section by a signal of a fourth information-2 section for each frequency bin, computes a feature value of a fifth information-1 section by dividing a signal of the fifth information-1 section by a signal of a fifth information-2 section for each frequency bin, and computes a feature value of a sixth information-1 section by dividing a signal of the sixth information-1 section by a signal of a sixth information-2 section for each frequency bin.

(Supplementary Note 10)

The radio wave feature value computation apparatus according to any one of Supplementary notes 1 to 9, further including a signal selection unit configured to select a fixed signal output from one specific individual within a fixed signal of the received communication wave, wherein the signal detection unit designates the information-1 section and the information-2 section within a fixed signal selected by the signal selection unit, the information-1 section signal processing unit performs Fourier transform on and outputs an information-1 section designated by the signal detection unit within a fixed signal selected by the signal selection unit, and the information-2 section signal processing unit performs Fourier transform on and outputs an information-2 section designated by the signal detection unit within a fixed signal selected by the signal selection unit.

(Supplementary Note 11)

The radio wave feature value computation apparatus according to Supplementary note 10, further including an N times averaging unit configured to perform, regarding a fixed signal selected by the signal selection unit, processing of averaging, for each frequency bin, feature values for N times computed by the feature value computation unit, where N is any natural number.

(Supplementary Note 12)

A radio wave emission source identification apparatus including:

a signal detection unit configured to designate, within a fixed signal included in a baseband signal of a received communication wave, an information-1 section and an information-2 section that are two types of signal sections having different communication information and being present in shorter time than fading of the received communication wave changing with time;

an information-1 section signal processing unit configured to perform Fourier transform on and output an information-1 section designated by the signal detection unit within the baseband signal;

an information-2 section signal processing unit configured to perform Fourier transform on and output an information-2 section designated by the signal detection unit within the baseband signal;

a feature value computation unit configured to compute a feature value, based on an output of the information-1 section signal processing unit and an output of the information-2 section signal processing unit; and an identification unit configured to specify an individual of an emission source of the received communication wave, based on a feature value computed by the feature value computation unit.

(Supplementary Note 13)

The radio wave emission source identification apparatus according to Supplementary note 12, further including a determination unit configured to acquire a specification result of the identification unit, and determine an individual of an emission source of the communication wave, based on the specification results for M times, where M is any natural number.

(Supplementary Note 14)

The radio wave emission source identification apparatus according to Supplementary note 13, wherein the determination unit determines, as an emission source of the communication wave, an individual specified as an emission source the most in the specification results for M times.

(Supplementary Note 15)

The radio wave emission source identification apparatus according to any one of Supplementary notes 12 to 14, wherein the feature value computation unit computes the feature value by dividing an output of the information-1 section signal processing unit by an output of the information-2 section signal processing unit for each frequency bin.

(Supplementary Note 16)

The radio wave emission source identification apparatus according to any one of Supplementary notes 12 to 15, wherein the information-1 section signal processing unit includes:
- an information-1 section signal clipping unit configured to clip the information-1 section from the baseband signal; and
- an information-1 section Fourier transformation unit configured to perform Fourier transform on a signal of an information-1 section clipped by the information-1 section signal clipping unit, and the information-2 section signal processing unit includes:
- an information-2 section signal clipping unit configured to clip the information-2 section from the baseband signal; and
- an information-2 section Fourier transformation unit configured to perform Fourier transform on a signal of an information-2 section clipped by the information-2 section signal clipping unit.

(Supplementary Note 17)

A radio wave feature value computation method including:
- designating, within a fixed signal included in a baseband signal of a received communication wave, an information-1 section and an information-2 section that are two types of signal sections having different communication information and being present in shorter time than fading of the received communication wave changing with time;
- performing Fourier transform on the information-1 section within the baseband signal;
- performing Fourier transform on the information-2 section within the baseband signal; and
- computing a feature value for identifying an emission source of the communication wave, based on a signal of the Fourier-transformed information-1 section and a signal of the Fourier-transformed information-2 section.

(Supplementary Note 18)

A radio wave emission source identification method including:
- designating, within a fixed signal included in a baseband signal of a received communication wave, an information-1 section and an information-2 section that are two types of signal sections having different communication information and being present in shorter time than fading of the received communication wave changing with time;
- performing Fourier transform on the information-1 section within the baseband signal;
- performing Fourier transform on the information-2 section within the baseband signal;
- computing a feature value, based on a signal of the Fourier-transformed information-1 section and a signal of the Fourier-transformed information-2 section; and
- specifying an individual of an emission source of the received communication wave, based on the computed feature value.

(Supplementary Note 19)

A non-transitory computer readable medium that stores a program for causing a processor to execute processing including:
- designating, within a fixed signal included in a baseband signal of a received communication wave, an information-1 section and an information-2 section that are two types of signal sections having different communication information and being present in shorter time than fading of the received communication wave changing with time;
- performing Fourier transform on the information-1 section within the baseband signal;
- performing Fourier transform on the information-2 section within the baseband signal; and
- computing a feature value for identifying an emission source of the communication wave, based on a signal of the Fourier-transformed information-1 section and a signal of the Fourier-transformed information-2 section.

(Supplementary Note 20)

A non-transitory computer readable medium that stores a program for causing a processor to execute processing including:
- designating, within a fixed signal included in a baseband signal of a received communication wave, an information-1 section and an information-2 section that are two types of signal sections having different communication information and being present in shorter time than fading of the received communication wave changing with time;
- performing Fourier transform on the information-1 section within the baseband signal;
- performing Fourier transform on the information-2 section within the baseband signal;
- computing a feature value, based on a signal of the Fourier-transformed information-1 section and a signal of the Fourier-transformed information-2 section; and
- specifying an individual of an emission source of the received communication wave, based on the computed feature value.

The radio wave feature value computation apparatus, the radio wave emission source identification apparatus, the method therefor, and the program according to the present disclosure are able to compute a feature value that is not influenced by multipath fading and is for specifying a radio wave emission source by using nonlinearity steadily present in a wireless communication terminal.

What is claimed is:

1. A radio wave feature value computation apparatus including:
   at least one memory storing instructions; and
   at least one processor configured to execute the instructions to:
   designate, within a fixed signal included in a baseband signal of a received communication wave, an information-1 section and an information-2 section that are two types of signal sections having different communication information and being present in shorter time than fading of the received communication wave changing with time;
   perform an information-1 section signal processing including performing Fourier transform on the designated information-1 section;
   perform an information-2 section signal processing including performing Fourier transform on the designated information-2 section; and compute a feature value for identifying an emission source of the communication wave, based on a result of the information-1 section signal processing and a result of the information-2 section signal processing.

2. The radio wave feature value computation apparatus according to claim 1, wherein
in the information-1 section signal processing, the at least one processor is configured to execute the instructions to:
clip the information-1 section from the baseband signal; and
perform Fourier transform on a signal of the clipped information-1 section, and
in the information-2 section signal processing, the at least one processor is configured to execute the instructions to:
clip the information-2 section from the baseband signal; and
perform Fourier transform on a signal of the clipped information-2 section.

3. The radio wave feature value computation apparatus according to claim 1, wherein
the fixed signal includes a single signal pattern that is repeated a plurality of times in the information-1 section and a single signal pattern that is repeated a plurality of times in the information-2 section,
in the information-1 section signal processing the at least one processor is configured to execute the instructions to:
clip two cycles of a first information-1 section and a second information-1 section from a single signal pattern that is repeated a plurality of times in the information-1 section;
perform Fourier transform on a signal of the first information-1 section and perform Fourier transform on a signal of the second information-1 section; and
compute, for each frequency bin, an average between the Fourier-transformed first information-1 section and the Fourier-transformed second information-1 section,
in the information-2 section signal processing, the at least one processor is configured to execute the instructions to:
clip two cycles of a first information-2 section and a second information-2 section from a single signal pattern that is repeated a plurality of times in the information-2 section;
perform Fourier transform on a signal of the first information-2 section and perform Fourier transform on a signal of the second information-2 section; and
compute, for each frequency bin, an average between the Fourier-transformed first information-2 section and Fourier-transformed second information-2 section, and
a signal length of the first information-1 section, a signal length of the second information-1 section, a signal length of the first information-2 section, and a signal length of the second information-2 section are equal to one another.

4. The radio wave feature value computation apparatus according to claim 1, wherein
the fixed signal includes a single signal pattern that is repeated a plurality of times in the information-1 section and a single signal pattern that is repeated a plurality of times in the information-2 section,
in the information-1 section signal processing, the at least one processor is configured to execute the instructions to:
clip two cycles of a first information-1 section and a second information-1 section from a single signal pattern that is repeated a plurality of times in the information-1 section; and
perform Fourier transform on a signal of the first information-1 section and perform Fourier transform on a signal of the second information-1 section,
in the information-2 section signal processing, the at least one processor is configured to execute the instructions to:
clip two cycles of a first information-2 section and a second information-2 section from a single signal pattern that is repeated a plurality of times in the information-2 section; and
perform Fourier transform on a signal of the first information-2 section and to perform Fourier transform on a signal of the second information-2 section,
the at least one processor is configured to execute the instructions to:
compute a first feature value by dividing, for each frequency bin, the Fourier-transformed first information-1 section by the Fourier-transformed first information-2 section;
compute a second feature value by dividing, for each frequency bin, the Fourier-transformed second information-1 section by the Fourier-transformed second information-2 section; and
compute, for each frequency bin, an average between the first feature value and the second feature value and output the computed average as the feature value, and
a signal length of the first information-1 section, a signal length of the second information-1 section, a signal length of the first information-2 section, and a signal length of the second information-2 section are equal to one another.

5. The radio wave feature value computation apparatus according to claim 1, the at least one processor is further configured to execute the instructions to select a fixed signal output from one specific individual within a fixed signal of the received communication wave, wherein
the at least one processor is configured to execute the instructions to designate the information-1 section and the information-2 section within the selected fixed signal,
in the information-1 section signal processing, the at least one processor is configured to execute the instructions to perform Fourier transform on the information-1 section designated within the selected fixed signal, and
in the information-2 section signal processing, the at least one processor is configured to execute the instructions to perform Fourier transform on the information-2 section designated within the selected fixed signal,
the at least one processor is further configured to execute the instructions to perform, regarding the selected fixed signal, processing of averaging, for each frequency bin, feature values computed for N times, where N is any natural number.

6. A radio wave emission source identification apparatus including:
at least one memory storing instructions; and
at least one processor configured to execute the instructions to:
to designate, within a fixed signal included in a baseband signal of a received communication wave, an information-1 section and an information-2 section that are two types of signal sections having different communication information and being present in shorter time than fading of the received communication wave changing with time;

perform an information-1 section signal processing including performing Fourier transform on the designated information-1 section;

perform an information-2 section signal processing including performing Fourier transform on the designated information-2 section;

compute a feature value, based on a result of the information-1 section signal processing and a result of the information-2 section signal processing; and specify an individual of an emission source of the received communication wave, based on the computed feature value.

7. A radio wave feature value computation method including:

designating, within a fixed signal included in a baseband signal of a received communication wave, an information-1 section and an information-2 section that are two types of signal sections having different communication information and being present in shorter time than fading of the received communication wave changing with time;

performing an information-1 section signal processing including performing Fourier transform on the designated information-1 section;

performing an information-2 section signal processing including performing Fourier transform on the designated information-2 section; and computing a feature value for identifying an emission source of the communication wave, based on a signal of the Fourier-transformed information-1 section and a signal of the Fourier-transformed information-2 section.

8. The radio wave feature value computation method according to claim 7, wherein the information-1 section signal processing includes:
  clipping the information-1 section from the baseband signal; and
  performing Fourier transform on a signal of the clipped information-1 section, and
the information-2 section signal processing includes:
  clipping the information-2 section from the baseband signal; and
  performing Fourier transform on a signal of the clipped information-2 section.

9. The radio wave feature value computation method according to claim 7, wherein the fixed signal includes a single signal pattern that is repeated a plurality of times in the information-1 section and a single signal pattern that is repeated a plurality of times in the information-2 section, the information-1 section signal processing includes:
  clipping two cycles of a first information-1 section and a second information-1 section from a single signal pattern that is repeated a plurality of times in the information-1 section;
  performing Fourier transform on a signal of the first information-1 section and performing Fourier transform on a signal of the second information-1 section; and
  computing, for each frequency bin, an average between the Fourier-transformed first information-1 section and the Fourier-transformed second information-1 section, the information-2 section signal processing includes:
  clipping two cycles of a first information-2 section and a second information-2 section from a single signal pattern that is repeated a plurality of times in the information-2 section;
  performing Fourier transform on a signal of the first information-2 section and performing Fourier transform on a signal of the second information-2 section; and
  computing, for each frequency bin, an average between the Fourier-transformed first information-2 section and the Fourier-transformed second information-2 section, and a signal length of the first information-1 section, a signal length of the second information-1 section, a signal length of the first information-2 section, and a signal length of the second information-2 section are equal to one another.

10. The radio wave feature value computation method according to claim 7, wherein the fixed signal includes a single signal pattern that is repeated a plurality of times in the information-1 section and a single signal pattern that is repeated a plurality of times in the information-2 section, the information-1 section signal processing includes:
  clipping two cycles of a first information-1 section and a second information-1 section from a single signal pattern that is repeated a plurality of times in the information-1 section; and
  performing Fourier transform on a signal of the first information-1 section and performing Fourier transform on a signal of the second information-1 section, the information-2 section signal processing includes:
  clipping two cycles of a first information-2 section and a second information-2 section from a single signal pattern that is repeated a plurality of times in the information-2 section; and
  performing Fourier transform on a signal of the first information-2 section and to performing Fourier transform on a signal of the second information-2 section, computing the average value includes:
  computing a first feature value by dividing, for each frequency bin, the Fourier-transformed first information-1 section by the Fourier-transformed first information-2 section;
  computing a second feature value by dividing, for each frequency bin, the Fourier-transformed second information-1 section by the Fourier-transformed second information-2 section; and
  computing, for each frequency bin, an average between the first feature value and the second feature value and outputting the computed average as the feature value, and a signal length of the first information-1 section, a signal length of the second information-1 section, a signal length of the first information-2 section, and a signal length of the second information-2 section are equal to one another.

11. The radio wave feature value computation method according to claim 7, further comprising selecting a fixed signal output from one specific individual within a fixed signal of the received communication wave, wherein the information-1 section and the information-2 section are designated within the selected fixed signal, in the information-1 section signal processing, Fourier transform is performed on the information-1 section designated within the selected fixed signal, and in the information-2 section signal processing, Fourier transform is performed on the information-2 section designated within the selected fixed signal, the radio wave feature value computation method further comprises performing, regarding the selected fixed signal, processing of averaging, for each frequency bin, feature values computed for N times, where N is any natural number.

12. A radio wave emission source identification method including:

designating, within a fixed signal included in a baseband signal of a received communication wave, an information-1 section and an information-2 section that are two types of signal sections having different communication information and being present in shorter time than fading of the received communication wave changing with time;

performing Fourier transform on the information-1 section within the baseband signal;

performing Fourier transform on the information-2 section within the baseband signal;

computing a feature value, based on a signal of the Fourier-transformed information-1 section and a signal of the Fourier-transformed information-2 section; and specifying an individual of an emission source of the received communication wave, based on the computed feature value.

* * * * *